United States Patent
Arunagiri et al.

(10) Patent No.: US 12,332,772 B1
(45) Date of Patent: Jun. 17, 2025

(54) AUTOMATED TEST CASE VALIDATION EXECUTION CORRESPONDING TO A DEFINED VALIDATION PROTOCOL

(71) Applicant: ValGenesis, Inc., Santa Clara, CA (US)

(72) Inventors: Arun Deepak Arunagiri, Chennai (IN); Ramesh Chinnaraju, Chennai (IN); Thirukkumaran Susendran, Chennai (IN); Sivakumar Muthusamy, Fremont, CA (US)

(73) Assignee: VALGENESIS, INC., Santa Clara, CA (US)

( * ) Notice: Subject to any disclaimer, the term of this patent is extended or adjusted under 35 U.S.C. 154(b) by 0 days.

(21) Appl. No.: 19/067,471

(22) Filed: Feb. 28, 2025

(30) Foreign Application Priority Data

Dec. 30, 2024  (IN) .............. 202411104495

(51) Int. Cl.
  *G06F 11/3668*  (2025.01)
  *G06F 40/226*  (2020.01)
  *G06V 30/41*  (2022.01)
(52) U.S. Cl.
  CPC ...... *G06F 11/3692* (2013.01); *G06F 11/3684* (2013.01); *G06F 40/226* (2020.01); *G06V 30/41* (2022.01)
(58) Field of Classification Search
  None
  See application file for complete search history.

(56) References Cited

U.S. PATENT DOCUMENTS

| | | | |
|---|---|---|---|
| 11,099,972 B2* | 8/2021 | Puszkiewicz | G06F 11/3692 |
| 11,756,036 B1* | 9/2023 | Aggarwal | G06V 40/1365 |
| | | | 705/44 |
| 11,915,479 B1* | 2/2024 | Lavie | G06N 3/08 |
| 2021/0224356 A1* | 7/2021 | Farre Guiu | G06F 21/577 |
| 2022/0001210 A1* | 1/2022 | Letourneau | G16H 40/40 |
| 2022/0058336 A1* | 2/2022 | Anders | G06F 16/93 |

OTHER PUBLICATIONS

IPcom, "Method embed expected test results within structured test data", 2010, IP.Com No. IPCOM000196851D (Year: 2010).*

(Continued)

*Primary Examiner* — Hossain M Morshed
(74) *Attorney, Agent, or Firm* — Amin, Turocy & Watson, LLP

(57) ABSTRACT

Automated test case validation execution is presented herein. A system obtains image data representing a test result of a test step of a validation process; extracts the test result from the image data; derives an expected result from an expected result sentence that has been obtained from a first cell of a row of a table of a document, in which the row corresponds to the test step; based on the test result and the expected result, determines a test status of the test step; generates a result sentence comprising the test result and a portion of the expected result sentence; generates a javascript object notation (JSON) data structure comprising the result sentence and the test status; and populates, using the JSON data structure, a second cell of the row with the result sentence and a third cell of the row with the test status.

20 Claims, 19 Drawing Sheets

(56) References Cited

OTHER PUBLICATIONS

Das, Suman. "Fine Tune Large Language Model(LLM) on a Custom Dataset withQLoRA" Medium. Jan. 24, 2024. [https://dassum.medium.com/fine-tune-large-language-model-llm-on-a-custom-dataset-with-qlora-fb60abdeba07] retrieved Jan. 31, 2025, 31 pages.
Papikyan, Armine. "Fine-tuning large language models (LLMs) in 2024" SuperAnnotate. Jul. 23, 2024. [https://www.superannotate.com/blog/llm-fine-tuning] retrieved Jan. 31, 2025, 26 pages.
Ferrer, Josep. "Fine-Tuning LLMs: A Guide With Examples" Datacamp. Dec. 4, 2024. [https://www.datacamp.com/tutorial/fine-tuning-large-language-models] retrieved Feb. 10, 2025, 13 pages.

\* cited by examiner

AUTOMATED TEST CASE VALIDATION EXECUTION CORRESPONDING TO A DEFINED VALIDATION PROTOCOL

RELATED APPLICATION

The subject patent application claims priority to Indian Provisional Patent Application No. 202411104495, filed Dec. 30, 2024, and entitled "AUTOMATED VALIDATION TEST CASE EXECUTION CORRESPONDING TO A DEFINED VALIDATION PROTOCOL", the entirety of which priority application is hereby incorporated by reference herein.

TECHNICAL FIELD

The subject disclosure generally relates to embodiments for automated test case validation execution corresponding to a defined validation protocol.

BACKGROUND

Conventional validation execution technologies have many operational challenges including, but not limited to, incurring lengthy test validation execution time(s), being susceptible to human error(s), and incurring increased regulatory compliance risk(s).

For example, conventional test validation execution includes manual validation of execution of test steps of a validation process, requiring numerous manual activities such as data entry, screenshot capture, photo upload, file attachment, and detailed documentation. Such validation tasks include manual review and interpretation of information captured as evidence representing result(s) of a test step; and conclude with manual selection, in a test document, of a test status/result of the test step, e.g., Pass, Fail, or Not Applicable (N/A). Each validation task corresponding to a test step can take approximately 15 to 20 minutes to complete. In this regard, since a typical equipment operation qualification document includes 10 to 20 test steps per page and can be over 100 pages long, conventional test validation execution, e.g., of moderate complexity, can take 25 to 30 days to complete.

Further, conventional validation of execution of test steps corresponding to a validation process evokes human errors associated with manual entry of test result(s) and/or interpretation of the test result(s) including, e.g., incorrect data entry; erroneous attachment of incorrect images, screenshots, and/or files corresponding to test result(s); and/or erroneous interpretation of test result(s)/evidence of test result(s). In turn, inaccurate and/or inconsistent test result documentation can delay manufacturing, divert business resources from pursuing strategic initiatives, and lead to regulatory issues, e.g., impacting product approvals, production timelines, and/or product manufacturing. Consequently, conventional validation execution technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
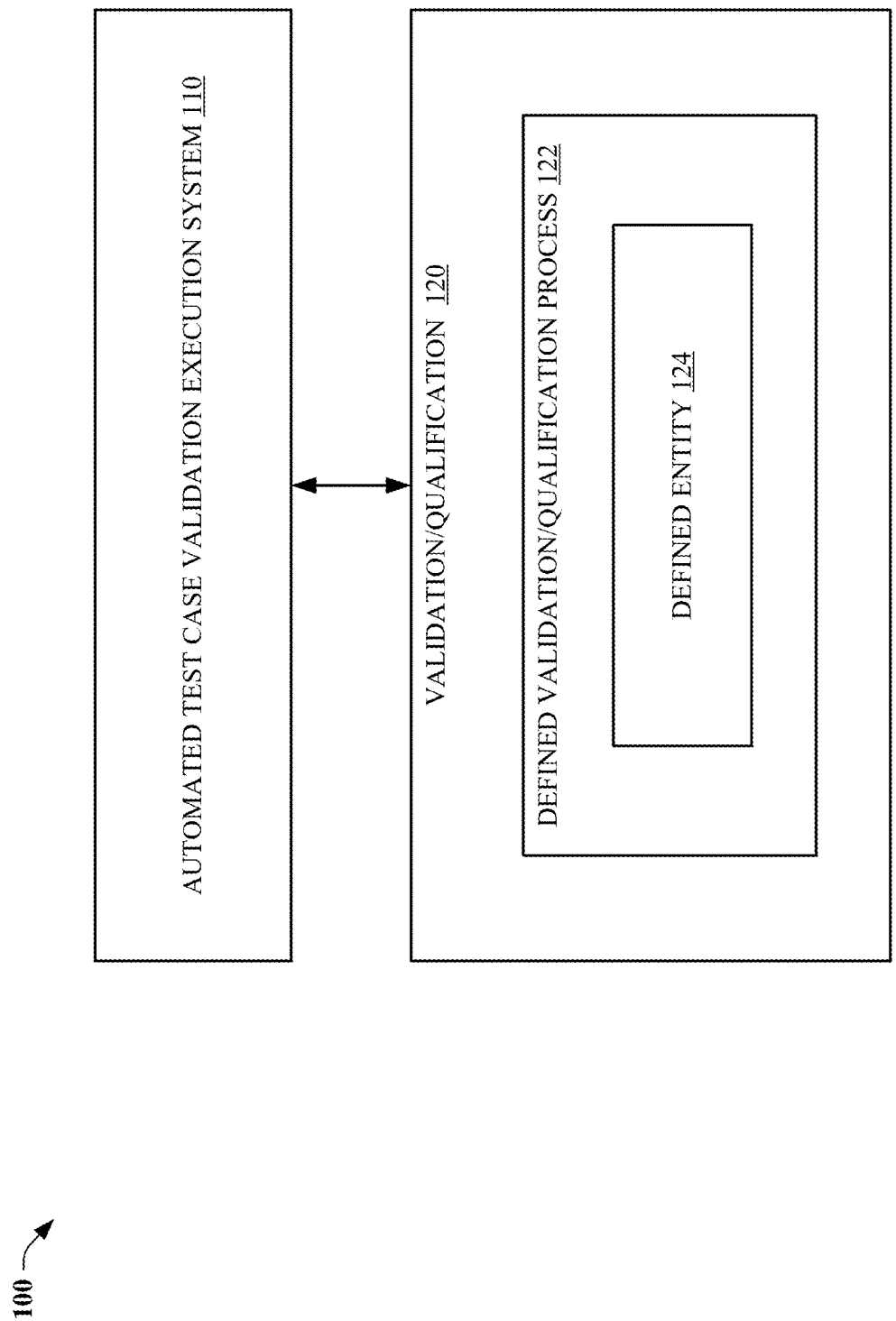
FIG. 1 illustrates a block diagram of a test case validation/qualification execution environment including an automated test case validation execution system that facilitates automated test case validation/qualification execution corresponding to a defined validation/qualification protocol, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional validation execution technologies have had some drawbacks such as incurring lengthy test validation execution times, e.g., 25-30 days, which result from manual review and interpretation of information captured as evidence of results of test steps; and manual selections, within in a test document (e.g., an equipment OQ document), of results of test steps, e.g., whether test steps have passed, failed, or are N/A.

Further, conventional validation execution technologies are susceptible to human error resulting from manual entry of test results and/or interpretation of the test results including, e.g., incorrect data entry of test result(s); erroneous attachment of incorrect images, screenshots, and/or files representing evidence of the test result(s); and/or erroneous interpretation of the evidence/test result(s). In turn, inaccurate and/or inconsistent test result documentation can delay manufacturing, divert business resources from pursuing strategic initiatives, and lead to regulatory issues, e.g., impacting product approvals, production timelines, and/or product manufacturing.

On the other hand, in various embodiments disclosed herein, an automated test case validation execution system can facilitate efficient, consistent, and more accurate validation/qualification by automatically performing test case validation execution corresponding to a defined validation/qualification protocol of a defined validation/qualification process. For example, in response to image-based test evidence representing respective test results of test steps (e.g., of an equipment OQ document corresponding to the defined validation/qualification process) being determined, by the automated test case validation execution system, to have been uploaded by test personnel for initiation of automated test case validation execution, the automated test case validation execution system can initiate/perform: (1) electronic parsing of the image-based test evidence (e.g., photos, images, videos, documents, and/or screenshots), and digital extraction of a test result of a test step from the image-based test evidence to obtain an image-derived result; (2) derivation of a defined expected result for the test step from an expected result sentence; (3) generation of a result sentence that includes the image-derived result and a portion of the expected result sentence; (4) machine learning process-based interpretation of the image-derived result based on the defined expected result to obtain a derived test status (e.g., pass/fail) of the test step; and (5) automated update, via document execution, of test result documentation with the result sentence that includes the image-derived result and the derived test status.

Benefits of embodiments of the automated test case validation execution system include saving test case validation execution time and correspondingly improving production timelines by automating the following: data entry via electronic parsing of uploaded images to obtain electronically parsed test evidence of respective test steps of a defined qualification/validation process; digital extraction of test results from the electronically parsed test evidence to obtain image derived test results; interpretation, based on defined test result conditions, of the image derived test results to obtain respective derived status of the respective test steps; and automated update of test result documentation with the image derived test results and the respective derived status of the respective test steps, e.g., completing test case validation execution for each test result of the test results within 3 seconds, compared to conventional manual test case validation execution of a test step requiring 15 to 20 minutes to complete, e.g., reducing validation test case execution time by 400%.

Embodiments of the automated test case validation execution system provide further benefits of improving accuracy and reliability of test case validation execution by minimizing human errors corresponding to manual entry of test results and/or interpretation of the test results, e.g., improving regulatory compliance by reducing risks associated with inaccurate test result documentation and subjective assessment of test evidence by test personnel. Further, as test case validation execution is performed before launching/releasing a product to market, faster test case validation execution enables a faster time-to-market of the product.

In such embodiments, the automated test case validation execution system can minimize human errors in test case validation execution by utilizing a machine learning process to perform a Q review of the defined validation/qualification process that has been performed by the automated test case validation execution system. For example, the machine learning process can perform the Q review by determining whether a recorded test status of a test step, which has been manually entered into the OQ document by test personnel via the UI, is different from a derived test status for the test step that has been derived by the automated test case validation execution system; and in response to the recorded test status being determined to be different from the derived test status, the machine learning process can determine whether a recorded test result of the test step, which has been manually entered into the OQ document by the test personnel via the UI, is different from an image-derived result of the test step that has been extracted from an image.

In this regard, in response to the recorded test result being determined to be different from the image-derived result, the machine learning process can generate a Q review report (e.g., Q report document, Q summary) that indicates that a "mismatched status" has been determined for the test step, and that mismatched status has been associated with (1) a mismatch between the image-based test evidence and the recorded test result; (2) a grammar and/or spelling error in the recorded result or the result sentence; (3) a risk mitigation condition that applies to the test step; and/or (4) test requirement gap(s)/difference(s) between test steps, different from the test step, which comprise respective defined expected results that are the same as the defined expected result of the test step.

In embodiment(s), a system, e.g., an automated test case validation execution system, comprises: at least one processor, coupled to at least one memory, that executes or facilitates execution of executable components, comprising: a test case validation execution initiation component that initiates, via a UI, an execution of an authored document comprising a table of rows and columns, in which each row of the table represents a respective test step corresponding to a defined validation process, and in which each row comprises a respective test result cell and a respective test status cell that are populated, by the system via the execution of the authored document, with a test result of the respective test step and a test status of the respective test step, respectively, in response to an image representing the test result being obtained by the system during the execution of the authored document.

Further, the automated test case validation execution system comprises an automatic test case validation execution component that, in response to the image representing the test result being obtained by the system during the execution of the authored document, automatically (e.g., in response to detecting that the image has been uploaded, via the UI, and t that the image has been associated with (e.g., "attached to") the authored document as evidence of a result of the test step) parses the image and extracts the test result from the image; derives a defined expected result for the test step from an expected result sentence that has been obtained from an expected result sentence cell of a row of the rows; interprets the test result based on the defined expected result to derive the test status (e.g., pass, fail, N/A); generates a result sentence comprising the test result and a portion of the expected result sentence; generates a javascript object notation (JSON) data structure comprising the result sentence and the test status; and populates, using the JSON data structure via the execution of the authored document, the test result cell and the test status cell with the result sentence and the test status, respectively.

In other embodiment(s), the automatic test case validation execution component comprises an image processing component, an image extraction component, a sentence extraction component, and a validation execution component. The image processing component obtains, via the UI corresponding to an upload operation, an uploaded image, a video comprising a series of frames comprising respective images, a file comprising a series of pages, or a snapshot comprising a display image of a display of an equipment that has been used during the respective test step; based on the uploaded image, a respective image of the respective images of the series of frames of the video, a page of the series of pages of the file, or the display image of the snapshot into the image, generates the image; and converts the image into a revised image comprising base 64 format.

The image extraction component parses the revised image and extracts the test result from the revised image; and the sentence extraction component, via a fine-tuned language learning model (LLM), derives the defined expected result from the expected result sentence, and generates the result sentence comprising the test result and the portion of the expected result sentence.

The validation execution component utilizes the fine-tuned LLM to interpret the test result based on the defined expected result to derive the test status; generate the JSON data structure comprising the result sentence and the test status; and based on a mapping of respective elements of the JSON data structure to respective cells of a second row of the table corresponding to the test status, populate, via the execution of the authored document, the test result cell and the test status cell with the result sentence and the test status, respectively.

In yet other embodiment(s), the automated test case validation execution system further comprises a validation/qualification component that utilizes a machine learning process to perform a Q review of the defined validation process according to a defined validation protocol, the Q review comprising obtaining a recorded test result of the respective test step and a recorded test status of the respective test step, in which the recorded test result and the recorded test status have been entered, via the UI, into the authored document; in response to determining that the recorded test status is different than the test status, determining whether the recorded test result is different than the test result; and in response to determining that the recorded test result is different than the test result, determining whether there is a mismatch between the image representing the test result and the recorded test result, determining whether at least one of the recorded result or the result sentence comprises at least one of a grammatical error or a spelling error, determining, based on a defined risk level and a defined process condition for the defined risk level that have been associated with the respective test step, whether a risk mitigation condition applies to the respective test step, and/or determining whether test steps that are different from the test step and that correspond to the defined validation process comprise respective defined expected results that are the same as the defined expected result of the test step for identifying test requirement gaps representing differences between the respective defined expected result and the defined expected result.

In embodiment(s), in response to determining that the recorded test result is the same as the test result, the validation/qualification component: updates a review comment of the row with text representing that there is mismatched status; and updates a review status of the row with text representing that the respective test step has been verified.

In other embodiment(s), the row is a first row; the respective test step is a first test step; the authored document comprises a defined document type; respective defined properties have been assigned to respective cells of the columns and have been associated with respective cell properties that have been defined by the defined document type; a first defined property of the respective defined properties that has been assigned to a first cell of the respective cells corresponding to a first column of the columns and a second row of the rows corresponding to a second test step prevents the first cell from being modified; a second defined property of the respective defined properties that has been assigned to a second cell of the respective cells corresponding to a second column of the columns and the second row corresponding to the second test step enables the second cell to be modified by the system via the defined validation process during the execution of the authored document; and a third defined property of the respective defined properties that has been assigned to a third cell of the respective cells corresponding to a third column of the columns and the second row enables the third cell to be modified by the system via the defined validation process during the execution of the authored document.

In this regard, in yet other embodiment(s), the authored document is an MS® Word document, an Adobe® PDF document, or an MS® Excel document; and the respective defined properties comprise: executable with audit trail, executable without audit trail, recorded test result with audit trail, recorded test result without audit trail, non-executable, expected result, expected result sentence, result with audit trail, result without audit trail, recorded test status with audit trail, recorded test status without audit trail, audit trail, and witnessed and verified by.

In embodiment(s), the authored document is the Adobe® PDF document, and the respective defined propertied comprise: textbook executable, recorded test result, dropdown result, or recorded test status.

In other embodiment(s), the authored document is the MS® Word document or the MS® Excel document, and the respective cell properties comprise: write, unlock, open to enter, or open to select.

In yet other embodiment(s), the authored document is the MS® Word document or the MS® Excel document, and the respective cell properties comprise: read, lock, or non-editable.

In embodiment(s), the authored document is the Adobe® PDF document, and the respective cell properties comprise: write, unlock, open to enter, or open to select.

In other embodiment(s), a method comprises: obtaining, by a system comprising at least one processor (e.g., the automated test case validation execution system), a document of a defined document type, in which the document comprises a table comprising respective columns, cells of the respective columns correspond to respective rows of the table, the respective rows correspond to respective test steps corresponding to a defined qualification process of a defined qualification protocol, a first cell of the cells corresponds to a first column of the respective columns and a row of the respective rows corresponding to a test step of the respective test steps, the first cell comprises an expected result sentence that describes an expected result of the test step utilizing a first group of words, a second cell of the cells corresponding to a second column of the respective columns and the row corresponding to the test step comprises a result sentence that describes a derived result of the test step utilizing a second group of words that has been derived from the expected result sentence, and a third cell of the cells corresponding to a third column of the respective columns and the row comprises a derived status of the test step.

The method further comprises: obtaining, by the system via the defined qualification process, an image comprising image result information representing the derived result of the test step; based on the image result information, extracting, by the system, the derived result from the image; extracting, by the system, the expected result from the first group of words of the expected result sentence; in response to comparing the expected result to the derived result, determining, by the system, the derived status of the test step; based on the expected result sentence, the derived result, and the derived status, generating, by the system, the result sentence comprising the second group of words; generating, by the system, respective elements of a JSON data structure comprising the result sentence and the derived status; and based on a mapping of the respective elements of the JSON data structure to the second cell corresponding to the second column that corresponds to the row of the test step and to the third cell corresponding to the third column that corresponds to the row of the test step, populating, by the system, the second cell with the result sentence, and populating, by the system, the third cell with the derived status.

In yet other embodiment(s), the obtaining of the image comprises: obtaining, via a UI of the system, an uploaded image, an uploaded video comprising a series of video frames comprising respective images, an uploaded file comprising a series of pages, or an uploaded display image comprising a snapshot of a display of a device corresponding to the test step; and generating the image based on the uploaded image, a video frame of the series of video frames of the uploaded video, a page of the series of pages of the uploaded file, or the uploaded display image of the display of the device.

In embodiment(s), the extracting of the derived result from the image comprises: parsing the image to obtain the derived result. Further, the extracting of the expected result from the first group of words of the expected result sentence comprises: obtaining the expected result sentence from the first cell of the table of the document; and deriving, utilizing a fine-tuned LLM, the expected result from the first group of words of the expected result sentence.

In other embodiment(s), the determining of the derived status comprises: based on the expected result and the derived result, determining the derived status.

In yet other embodiment(s), the method further comprises: determining, by the system utilizing a machine learning process of a Q review of the defined qualification process, whether a recorded test status of the test step that has been entered into the document via a UI of the system is different from the derived status; and in response to the recorded test status being determined to be different from the derived status, determining, by the system utilizing the machine learning process, whether the recorded test result is different from the derived result.

The method further comprises: in response to the recorded test result being determined to be different from the derived result, determining, by the system, whether there is a mismatch between the image representing the derived test result and the recorded test result; determining, by the system, whether the recorded test result and/or the result sentence comprises a grammatical error and/or a spelling error; determining, by the system based on a defined risk level and a defined process condition that have been associated with the test step for the defined risk level, whether a risk mitigation condition applies to the test step; and/or determining, by the system, whether test steps that are different from the test step and that correspond to the defined qualification process comprise respective expected results that are the same as the expected result for determining test requirement gaps between the test step and the test steps.

In yet other embodiments(s), a non-transitory machine-readable medium comprises executable instructions that, when executed by at least one processor, facilitate performance of operations, comprising: obtaining image data representing a test result of a test step of respective test steps of a validation process; extracting the test result from the image data; deriving an expected result from an expected result sentence that has been obtained from a first cell of a row of rows of a table of a document, wherein the rows correspond to the respective test steps, and wherein the row corresponds to the test step; based on the test result and the expected result, determining a test status of the test step; generating a result sentence comprising the test result and a portion of the expected result sentence; generating a JSON data structure comprising the result sentence and the test status; and populating, using the JSON data structure, a second cell of the row with the result sentence and a third cell of the row with the test status.

In embodiment(s), the populating further comprises: based on a mapping of respective elements of the JSON data structure to respective cells of the row comprising the first cell, the second cell, and third cell, populating the second cell with the result sentence and the third cell with the test status.

Figure 2:
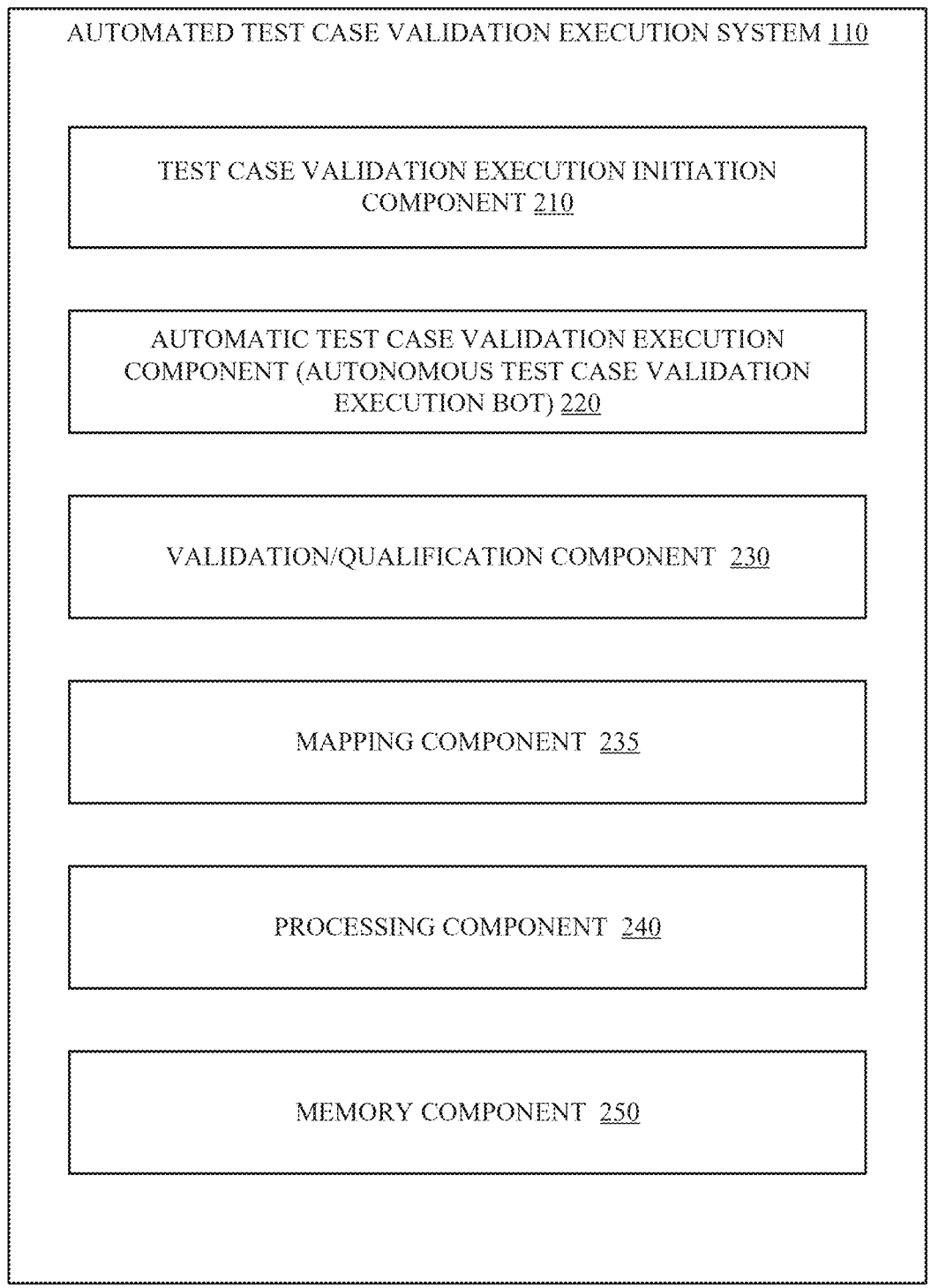
FIG. 2 illustrates a block diagram of the automated test case validation execution system, in accordance with various example embodiments.

Now referring to FIGS. 1-2, block diagrams (100, 200) of a test case validation/qualification execution environment (100) including an automated test case validation execution system (110) that facilitates automated test case validation/qualification execution corresponding to a defined validation/qualification protocol; and the automated test case validation execution system are illustrated, respectively, in accordance with various example embodiments.

The automated test case validation execution system includes a test case validation execution initiation component (210), an automatic test case validation execution component ("autonomous test case validation execution bot") (220), a validation/qualification component (230), a mapping component (235), a processing component (240), and a memory component (250). In embodiment(s), the memory component stores executable instructions that, when executed by the processing component, facilitate performance of operations by the automated test case validation execution system.

Figure 3:
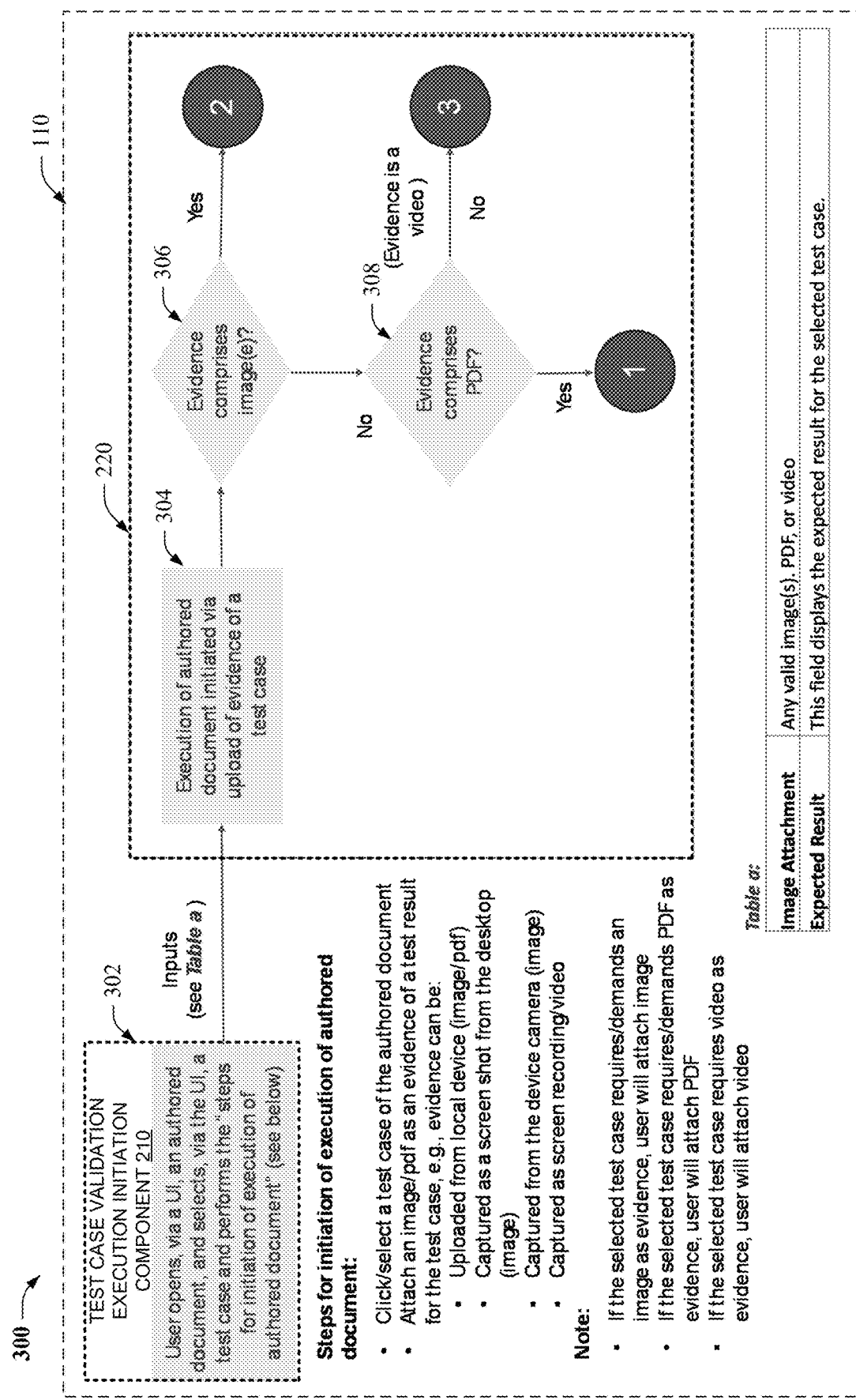
FIG. 3 illustrates a block diagram of operations that are performed via component(s) of the automated test case validation execution system, in accordance with various example embodiments.
Figure 4:
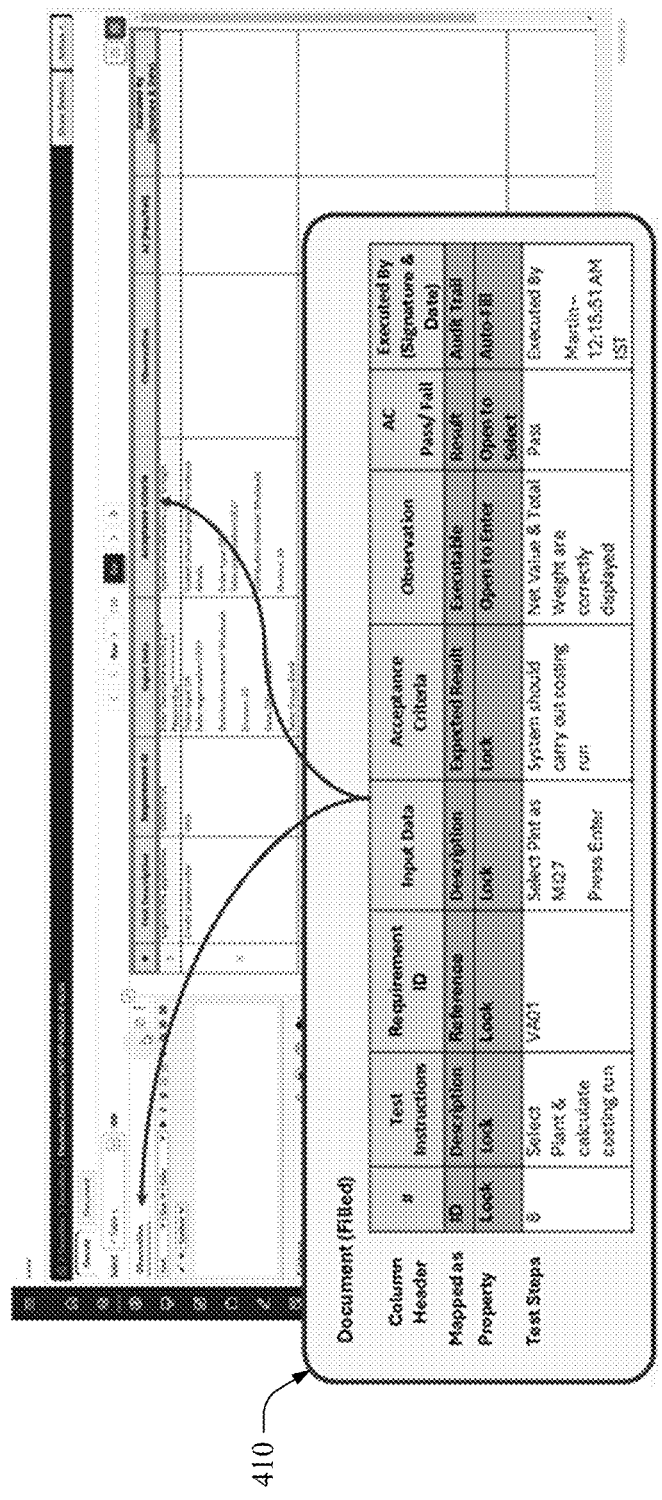
FIG. 4 illustrates a document comprising mapping properties for performance of an execution of the document via the automatic test case validation execution component, in accordance with various example embodiments.
Figure 5:
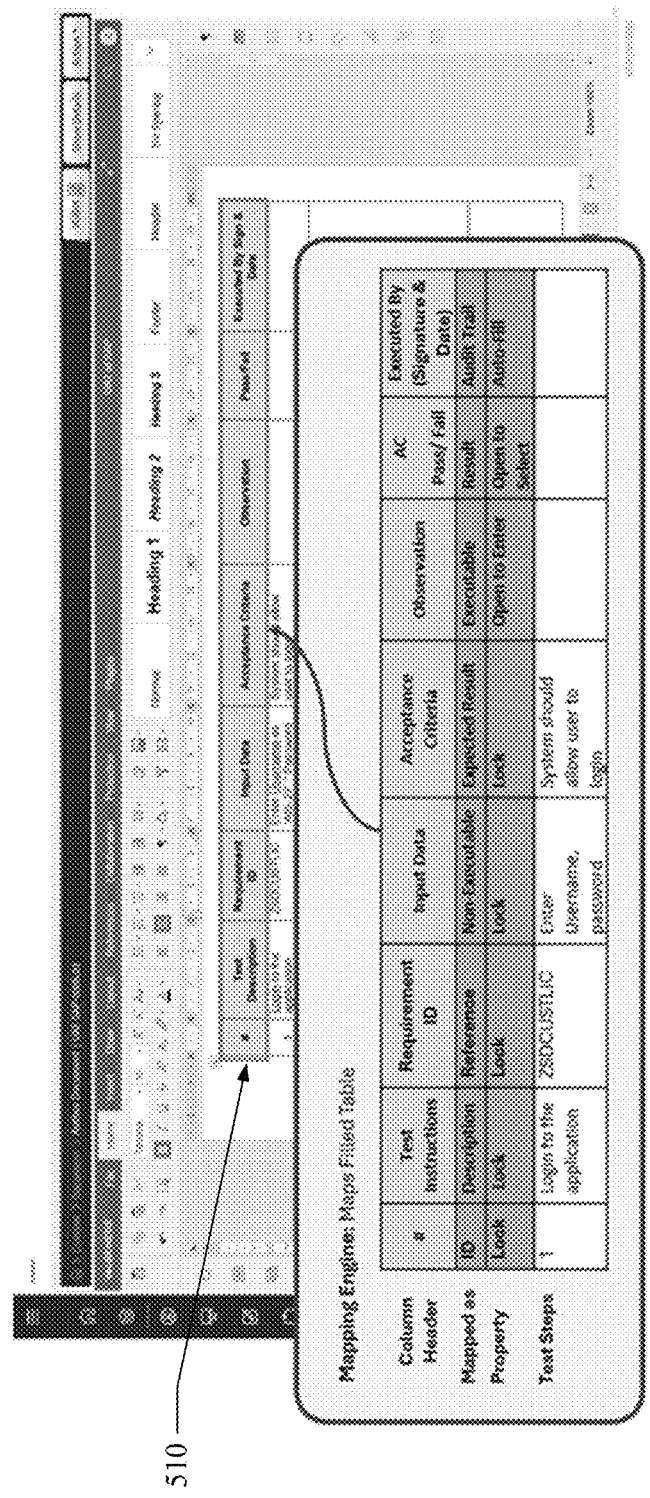
FIG. 5 illustrates a table of a document comprising respective columns, in which respective defined properties have been assigned, using a user interface (UI) via a mapping component (or mapping engine), to respective cells of the columns, and in which the respective defined properties have been associated, using the UI via a mapping component, with respective cell properties corresponding to a defined document type, in accordance with various example embodiments.
Figure 6:
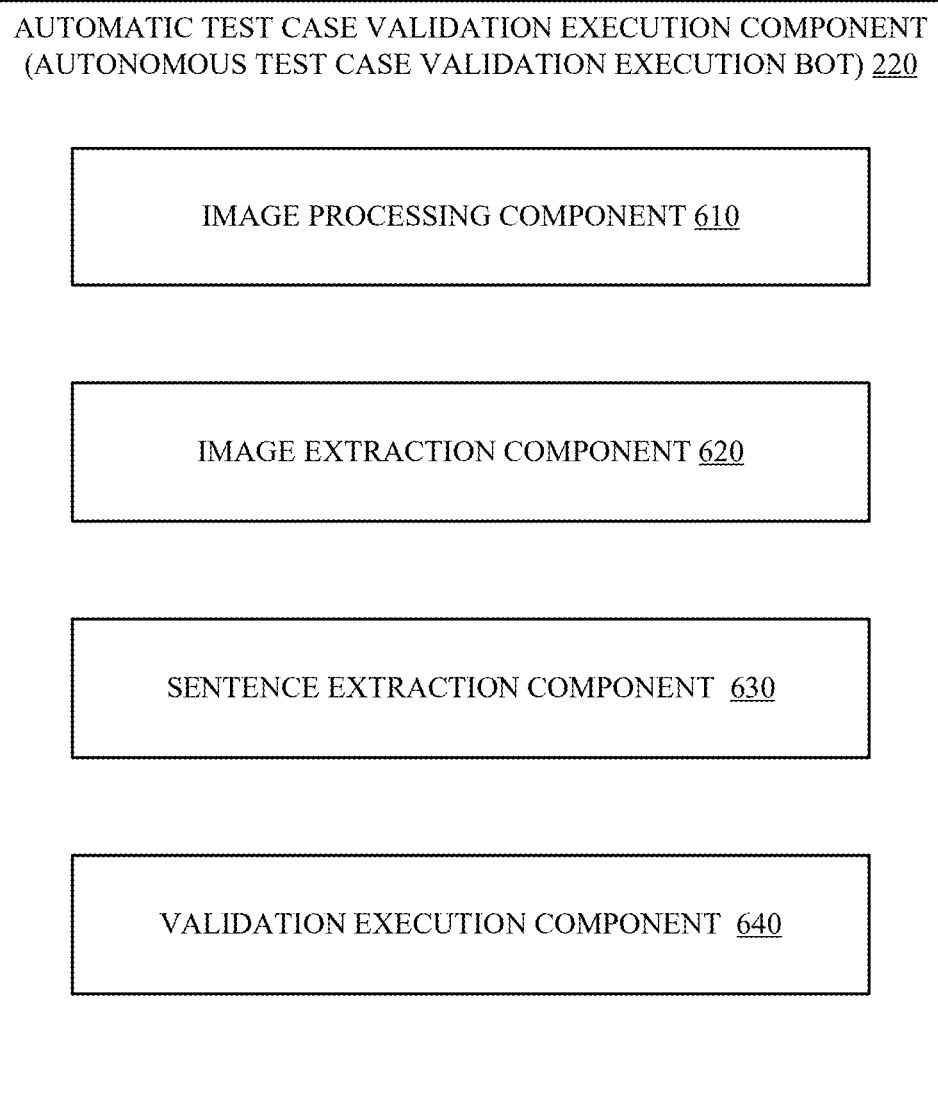
FIG. 6 illustrates a block diagram of an automatic test case validation execution component (e.g., autonomous test case validation execution bot (or autonomous test case validation execution program/process)), in accordance with various example embodiments.

Referring now to FIGS. 3-5, block diagrams (300, 400, 500) of operations that are performed via component(s) of the automated test case validation execution system; a document (410) (e.g., test document, equipment OQ document, test result document, authored document, executed document) of a defined document type (e.g., MS® Word document, Adobe® PDF document, MS® Excel); and a table (510) of the document are illustrated, respectively, in accordance with various example embodiments.

The table comprises respective columns that comprise cells that have been associated, using a UI (not shown) via the mapping component, with respective cell properties that have been defined by the defined document type and with respective defined properties. The following describes keyword/document mapping of the respective defined properties that have been assigned to the cells of the table:

§ 1.0 Document Mapping

A document mapping process corresponding to a document, e.g., authored document, is essential to determine which table(s) of the document can be included in a mapping table for performance of an execution of the document via the automatic test case validation execution component (e.g., autonomous test case validation execution bot). Mapping is completed before routing the document for approval of automated test case validation execution, e.g., before initiating execution of the document via the autonomous test case validation execution bot. By doing so, a user (e.g., test personnel, template creator, mapping keyword creator) corresponding to the execution of the document can ensure that necessary tables are correctly mapped for inclusion in the mapping table to perform test case validation execution of test steps corresponding to respective rows of the table.

In embodiment(s), the document (e.g., 410) comprises static/non executable columns (and/or cells) and executable columns (and/or cells) of tables (e.g., 510) comprising rows representing respective test cases (or test steps). The user can create, using mapping component 235 via the UI, mapping keywords representing the respective defined properties (e.g., "Comments with Audit Trail", "Comments without Audit Trail", "Executable with Audit Trail", "Recorded Test Result with Audit Trail", etc.) that are defined in the "Column Type" columns of § 1.1 and § 1.2 below, and further map/associate the respective defined properties to/with respective cell properties (e.g., write, unlock, open to enter, open to select, read, lock, non-editable) of an MS® Word document or an MS® Excel document, or to/with respective cell properties (e.g., write, unlock, open to enter, open to select) of an Adobe® PDF document that are defined in the "Description" columns of § 1.1 and § 1.2 as follows:

| §1.1 SUPPORTED KEYWORDS AND ASSOCIATED PROPERTIES FOR AN MS ® WORD DOCUMENT | |
|---|---|
| Column Type | Description |
| Comments with Audit Trail | (Write, unlock, open to enter) Comment column is where the user would enter any additional comments outside of executable or result data: <br> 1. Comments entered will be captured with Audit Trail (User ID along with Date & Time Stamp). <br> 2. The comment column would later be optional when a document is executed. <br> 3. More than one comment column can exist within the same table. |
| Comments without Audit Trail | (Write, unlock, open to enter) Comment column is where the user would enter any additional comments outside of executable or result data. <br> 1. Comments entered will be captured without Audit Trail (User Id along with Date & Time Stamp). <br> 2. The comment column would later be optional when a document is executed. <br> 3. More than one comment column can exist within the same table. |
| Executable/Recorded Test Result with Audit Trail | (Write, unlock, open to enter) Executable column is where the user would record actual results/evidence during execution: <br> 1. Executable columns should be mandatory fields during an execution. <br> 2. Examples include actual results, starting temperature, etc. <br> 3. More than one executable column can exist within the same table. <br> 4. Actual Results entered will be captured with Audit Trail (Executor and Witness User Id along with Date & Time Stamp). |
| Executable/Recorded Test Result without Audit Trail | (Write, unlock, open to enter) Executable column is where the user would record actual results/evidence during the execution: <br> 1. Executable columns should be mandatory fields during an execution. <br> 2. Examples include actual results, starting temperature, etc. <br> 3. More than one executable column can exist within the same table. <br> 4. Actual Results entered will be captured without Audit Trail (User Id along with Date & Time Stamp). |
| Non-Executable | (Read, lock, non-editable) Non-Executable columns are columns which are not executed: <br> 1. Examples include test no., instructions, expected results, etc. <br> 2. More than one non-executable column can exist within the same table. <br> 3. Results cannot be recorded in these columns; they are read-only fields. <br> 4. During the execution process, non-executable columns can also be modified through Edit option. |
| Expected Result/ Expected Result Sentence | (Read, lock, non-editable) This column is a non-executable column. If the user selects this column type, the system will provide a button during execution which will copy the contents from the Expected Result to Actual Result column. |

| | |
|---|---|
| §1.1 SUPPORTED KEYWORDS AND ASSOCIATED PROPERTIES FOR AN MS ® WORD DOCUMENT | |
| Column Type | Description |
| Reference | (Read, lock, non-editable) Reference column is used to link to other documents when a trace matrix is created:<br>1. For example, if a user requirement specification (URS) and a performance qualification (PQ) are to be linked in a trace matrix. Within the reference column of the PQ, specific requirements from the URS can be specified. The system will search for matches between the values in the PQ reference column with the first column (URS No.) from the URS document. When there is a match, the system will automatically build the link between the requirement and the PQ Test.<br>2. Only one reference column can exist within a table. |
| Result/Recorded Test Status with Audit Trail | (Write, unlock, open to select) Result column is where Pass, Fail, or N/A will be recorded by the user.<br>1. Results represent the status of the test.<br>2. The system will capture each failure that occurs in the test and discrepancies can be created from these failures.<br>3. Only one result column can exist within the same table.<br>4. Results entered will be captured with Audit Trail (Executor User ID along with Date & Time Stamp). |
| Result/Recorded Test Status without Audit Trail | (Write, unlock, open to select) Result column is where Pass, Fail, or N/A will be recorded by the user.<br>1. Results represent the status of the test.<br>2. The system will capture each failure that occurs in the test and discrepancies can be created from these failures.<br>3. Only one result column can exist within the same table.<br>4. Results entered will be captured without Audit Trail (User ID along with Date & Time Stamp). |
| Audit Trail | (Write, unlock, open to auto-populate) Audit Trail column is where the user ID and date and time stamp will be captured for a row that has been executed. Only one Audit Trail column can exist within the same table.<br>Note: Audit Trail column type cannot be used in a table along with any of the following Column Types: Comments with Audit Trail, Executable with Audit Trail, and Result with Audit Trail. |
| Witnessed and Verified By | (Write, unlock, open to auto-populate) Witnessed and verified by column is used to capture the witness Audit Trail. The system will allow to choose verifier while assigning or executing the execution task based on configuration.<br>This Column Type will be available for mapping only when "Enable Witnessed and Verified by Column feature" is configured as Yes. If configured as No, the audit trail of the Witness will be captured in Executable with Audit Trail Column.<br>Note that when the configuration for "Verification to be performed at" is set as "task level", this Column Type will be available in Create Mapping Keyword screen. The option to select Witnessed and Verify at Step/Table will be available in Assign Execution screen. |
| Esign at step | (Write, unlock, open to auto-populate) This column is used to capture the Executor Audit Trail. The system will allow the user to create a table with this column type only if 'table level' option has been configured for the setting "eSign to be performed at". Also, in that case the system will allow the user to create only 'eSign at step' or 'eSign at table' column type, not both.<br>Note that when the configuration is set as "task level", the Create Mapping Keyword screen will not have "eSign at Step" and "eSign at Table" options in Column Type. Instead, the option to select eSign at Row/Table will be available in Assign Execution screen. |
| Esign at Table | (Write, unlock, open to auto-populate) This column is used to capture the Executor Audit Trail. The system will allow the user to create a table with this column type only if 'table level' option has been configured for the setting "eSign to be performed at". Also, in that case the system will allow the user to create only 'eSign at step' or 'eSign at table' column type, not both.<br>Note that when the configuration is set as "task level", the Create Mapping Keyword screen will not have "eSign at Step" and "eSign at Table" options in Column Type. Instead, the option to select eSign at Row/Table will be available in Assign Execution screen. |
| Witnessed and Verify at Step | (Write, unlock, open to auto-populate) This column is used to capture the witness Audit Trail. The system will allow the user to create a table with this column type only if 'table level' option has been configured for the setting "eSign to be performed at". Also, in that case the system will allow the user to create only 'Witnessed and Verify at step' or 'Witnessed and Verify at table' column type, not both. |

| §1.1 SUPPORTED KEYWORDS AND ASSOCIATED PROPERTIES FOR AN MS ® WORD DOCUMENT ||
| --- | --- |
| Column Type | Description |
| | Note that when the configuration for "Verification to be performed at" is set as "task level", the Create Mapping Keyword screen will not have "Witnessed and Verify at Step" and "Witnessed and Verify at Table" options in Column Type. Instead, the option to select Witnessed and Verify at Step/Table will be available in Assign Execution screen. |
| Witnessed and Verify at Table | (Write, unlock, open to auto-populate) This column is used to capture the witness Audit Trail. The system will allow the user to map a table with this column type only if 'table level' option has been configured for the setting "eSign to be performed at". Also, in that case the system will allow the user to create only 'Witnessed and Verify at step' or 'Witnessed and Verify at table' column type, not both. Note that when the configuration for "Verification to be performed at" is set as "task level", the Create Mapping Keyword screen will not have "Witnessed and Verify at Step" and "Witnessed and Verify at Table" options in Column Type. Instead, the option to select Witnessed and Verify at Step/Table will be available in Assign Execution screen. |
| ID | (read, lock, non-editable) Non-executable This column is used to capture the Test Step No./Requirement No. |
| Description | (read, lock, non-editable) Non-executable This column is used to capture the Test Step description/Requirement description. |

| §1.2 SUPPORTED KEYWORDS AND ASSOCIATED PROPERTIES FOR AN ADOBE ® PDF DOCUMENT ||
| --- | --- |
| Column Type | Description |
| Textbox Comments | (Write, unlock, open to enter) Textbox Comment field is where the user would enter any additional comments outside of executable or result data:<br>1. Comments entered will be captured with Audit Trail (Executor User ID along with Date & Time Stamp).<br>2. eSigned stamp will be captured if eSign is provided for the field.<br>3. Witness Audit Trail will be captured if Witness is provided for the field.<br>4. Comment column should be mandatory fields during a PDF Execution. |
| Textbox Executable/Recorded Test Result | (Write, unlock, open to enter) Textbox Executable field is where the user would record actual results/evidence during execution:<br>1. Executable textboxes should be mandatory fields during an execution.<br>2. Examples include actual results, starting temperature, etc.<br>3. Actual Results entered will be captured with Audit Trail (Executor and Witness User ID along with Date & Time Stamp).<br>4. eSigned stamp will be captured if eSign is provided for the field.<br>5. Witness Audit Trail will be captured if Witness is provided for the field. |
| Dropdown Result/Recorded Test Status | (Write, unlock, open to select) Dropdown Result field is where Pass, Fail, or N/A will be recorded by the user.<br>1. Results represent the status of the test.<br>2. The system will capture each failure that occurs in the test and discrepancies can be created from these failures.<br>3. Results entered will be captured with Audit Trail (Executor User ID along with Date & Time Stamp).<br>4. eSigned stamp will be captured if eSign is provided for the field.<br>5. Witness Audit Trail will be captured if Witness is provided for the field. |

After mapping of the table has been completed, and now referring to FIG. 3, the test case validation execution initiation component initiates, via a UI (not shown) of the automated test case validation execution system, a test case validation execution of the authored document. As illustrated by FIG. 5, each row of the table represents a respective test step (or test case) (e.g., "test step #" '1' of "Test instructions" 'Login to the application') corresponding to a defined validation process; and each row comprises a respective test result cell (e.g., see "Observation" column) and a respective test status cell (e.g., see "AC Pass/Fail" column) that are populated, by the system via the automatic test case validation execution component during the execution of the authored document, with a test result of the respective test step and a test status of the respective test step, respectively, in response to an image representing the test result being obtained by the system during the execution of the authored document.

For example, at 302, a user, or test personnel (e.g., test validation executor), opens (or uploads), via the UI, the authored document, e.g., an equipment OQ document, for performance of automated test case validation. In this regard, after opening/uploading the equipment OQ document, the user selects, via the UI, a test step (or test case) of the respective test steps, and based on such selection, attaches (or uploads) (e.g. via an electronic interface (not shown), e.g., via a universal serial bus (USB) interface of the automated test case validation execution system) image-based test evidence of the test step, e.g., an image, a video comprising a series of frames comprising respective images, a file (e.g. PDF file) comprising a series of pages, or a snapshot comprising a display image of a display of an equipment that has been used during the respective test step.

In turn, at 304, in response to the image-based test evidence representing a test result of the test step being determined by the test case validation execution initiation component to have been uploaded by the user, the test case validation execution initiation component initiates a test case validation execution of the test case. Accordingly, an image processing component (610) obtains the image-based test evidence, and determines at 306 and 308, whether the image-based test evidence comprises image(s), a PDF file, or a video, respectively.

Referring now to FIGS. 7-13, in response to the image-based evidence being determined, by the image processing component, to comprise the PDF file, the image processing component loops through each page of the PDF at 702; converts each page into an image at 704; and converts each image into a revised image comprising base 64 format at 706.

Alternatively, in response to the to the image-based evidence being determined, by the image processing component, to comprise the image(s), the image processing component loops through each image at 802; and converts each image into a revised image comprising base 64 format at 804.

On the other hand, in response to the image-based evidence being determined, by the image processing component at 308, to comprise the video, the image processing component loops through each video frame/image of the video at 902; and converts each video frame/image into a revised image comprising base 64 format at 904.

Figure 7:
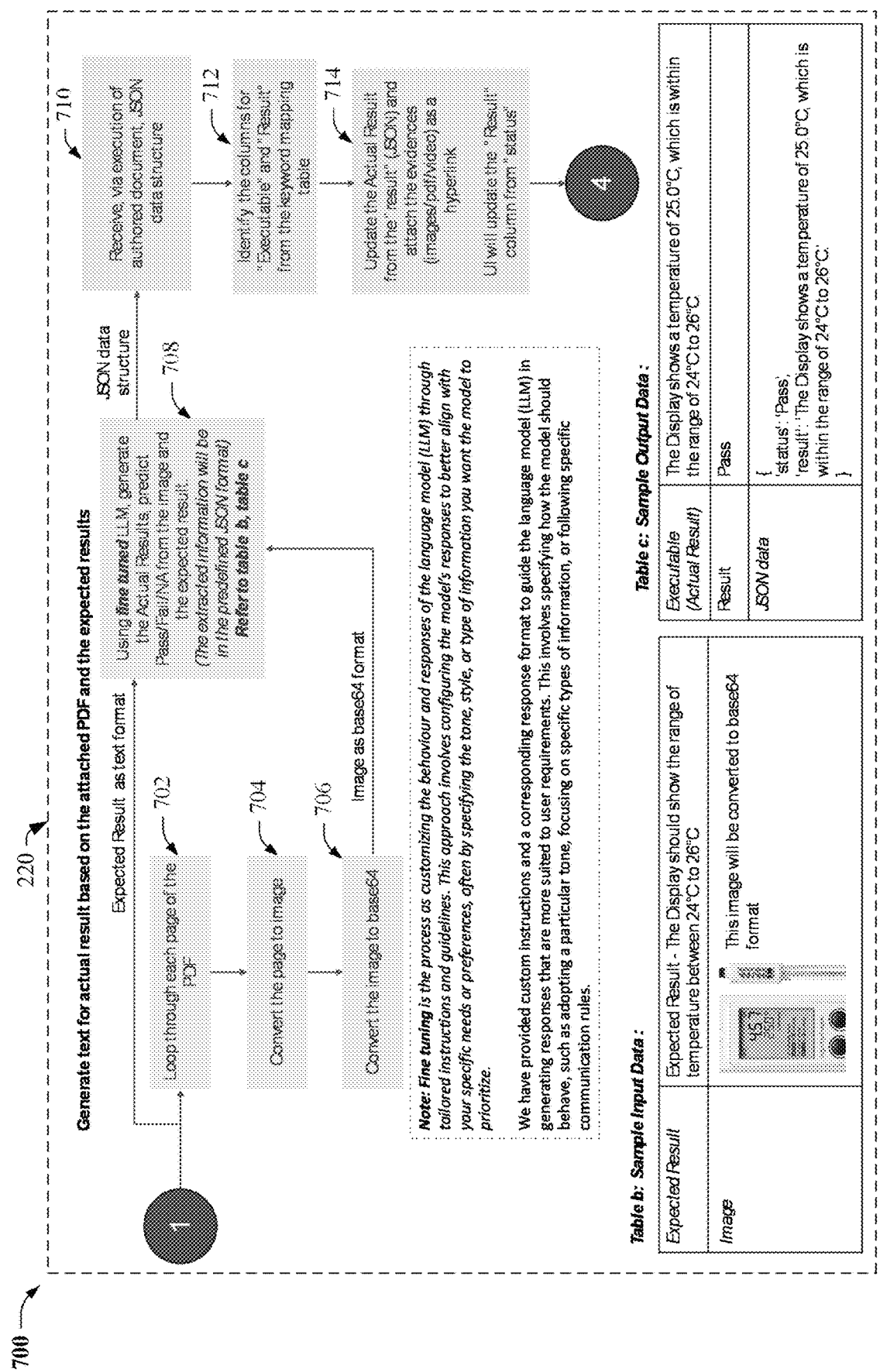
FIGS. 7-13 illustrate block diagrams of further operations that are performed via component(s) of the automated test case validation execution system, in accordance with various example embodiments.

For example, and now referring to Table b illustrated by FIG. 7, the image-based evidence can comprise an image of a display of an instrument (e.g., thermometer) that has recorded a pH (e.g., 4.57) of a product that has been used during the test step and a temperature (e.g., 25.0 degrees Celsius) of the product. Further, the image processing component can convert the image into a revised image comprising base 64 format.

In turn, an image extraction component (620), e.g., at 708, 806, and 906, parses the revised image and extracts the test result (e.g., temperature displayed equals 25.0 degrees Celsius, pH displayed equals 4.57) from the revised image, e.g., utilizing a machine learning-based process that has trained the extraction component, based on defined image extraction rules and defined image extraction example processes, to extract base 64 format results from the revised image that represent and/or correspond to, e.g., instrument measurement values and/or numerical values.

A sentence extraction component (630), e.g., at 708, 806, and 906, utilizes a fine-tuned LLM, e.g., a fine-tuned Generative Pre-trained Transformer (GPT), to derive a defined expected result for the test step from an expected result sentence that has been obtained from an expected result sentence cell of the row of the test step.

For example, and referring again to Table b, the sentence extraction component can obtain, from the expected result sentence cell of the row of the test step, the expected result sentence, which states: "The Display should show the range of temperature between 24° C. and 26° C."

In embodiment(s), fine tuning an LLM is a process of customizing behaviour(s) and response(s) of the LLM through tailored instructions and guidelines, e.g., using "tokenizers". Such process involves configuring the LLM's responses to better align with defined needs or preferences, often by specifying a tone, a style, or a type of information that the LLM model is to prioritize, e.g., to derive/identify the defined expected result from the expected result sentence.

In embodiment(s), the fine-tuned LLM is provided, via the sentence extraction component, defined instructions and corresponding response format(s) to guide the LLM in extracting/deriving/identifying the defined expected result from the expected result sentence, e.g., designating the LLM to adopt a particular tone, focus on specific types of information (e.g., a numbered value, a stated condition corresponding to the numbered value), and/or follow specific communication rule(s) to extract/derive/identify the defined expected result from the expected result sentence.

For example, and referring again to Table b illustrated in FIG. 7, the fine-tuned LLM can break down text of the expected result sentence into smaller units called tokens comprising, e.g., groups of words and/or numbers, assign a unique identification (ID) to each token, and based on learned patterns for generating the tokens according to the defined instructions and corresponding response format(s), extract/derive/identify, using the respective IDs, the defined expected result and a portion of the expected result sentence from the expected result sentence.

In embodiment(s), respective portions of the expected result sentence (1) define and/or state what the defined expected result represents (e.g., a measured temperature), and define and/or state (2) a defined "Pass" condition for the test step (e.g., that the measured temperature be within a defined range of temperatures). In this regard, a validation execution component (540) utilizes the fine-tuned LLM, e.g., based on the tailored instructions and guidelines (e.g., using tokenizers), to interpret (e.g., compare) the test result (e.g., the measured temperature) with the respective portions of the expected result sentence representing the defined expected result and the defined Pass condition for the test step (e.g., that the measured temperature be determined to be within a defined range of temperatures corresponding to the defined Pass condition) to determine/derive a test status, e.g., Pass, Fail, N/A, for the test step.

Referring again to the embodiment illustrated via Table c, in response to determining, based on the interpretation (e.g., comparison) of the test result and the respective portions of the expected result sentence, that the measured temperature of 25.0° C. satisfies the defined Pass condition for the test step, e.g., that the measured temperature is within 24° C. to 26° C., the validation execution component determine the test status as "Pass."

In turn, the sentence extraction component utilizes the fine-tuned LLM to generate, based on the test status, the result sentence comprising the test result and the portion of the expected result sentence, e.g., "The Display shows a temperature of 25.0° C., which is within the range of 24° C. to 26° C."

Figure 8:
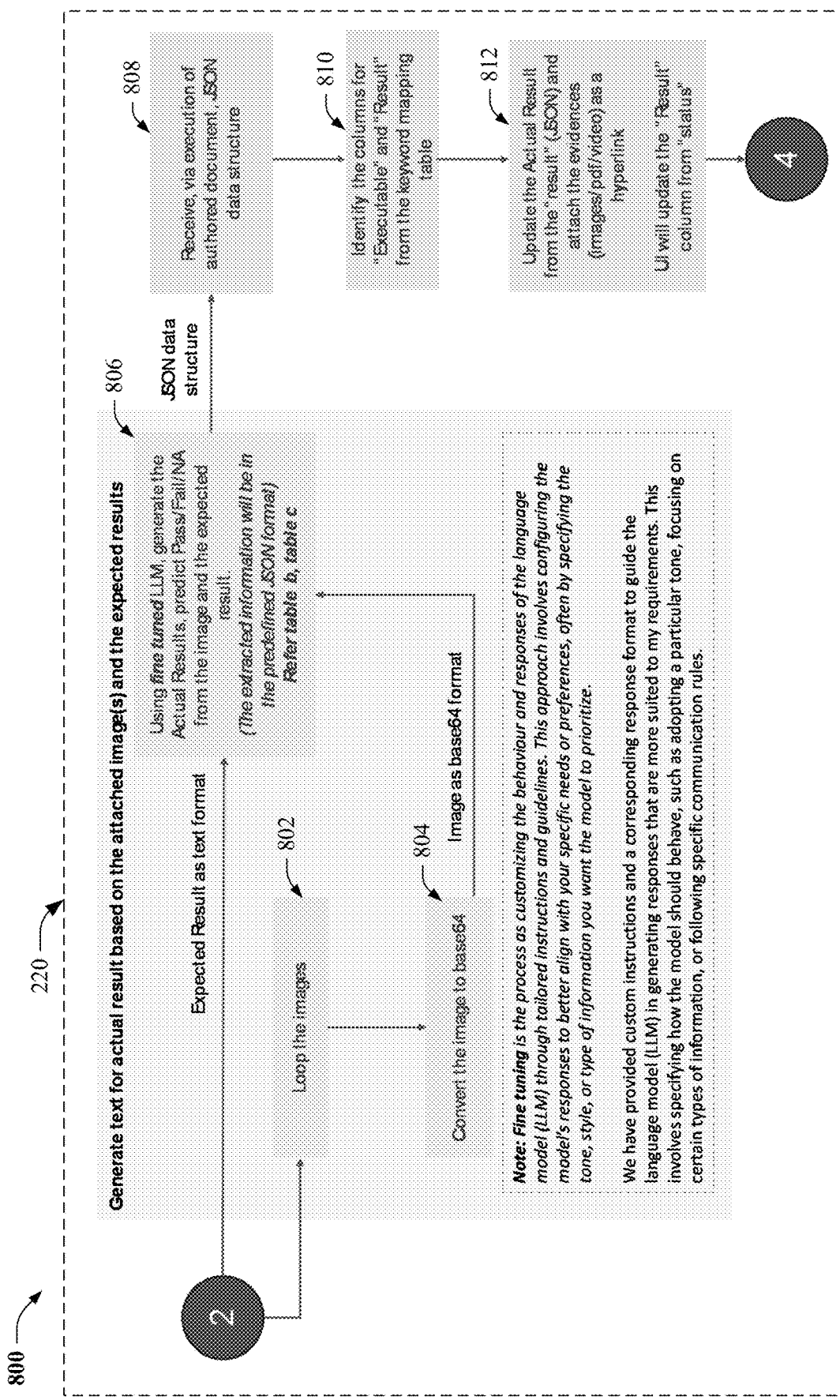
Figure 9:
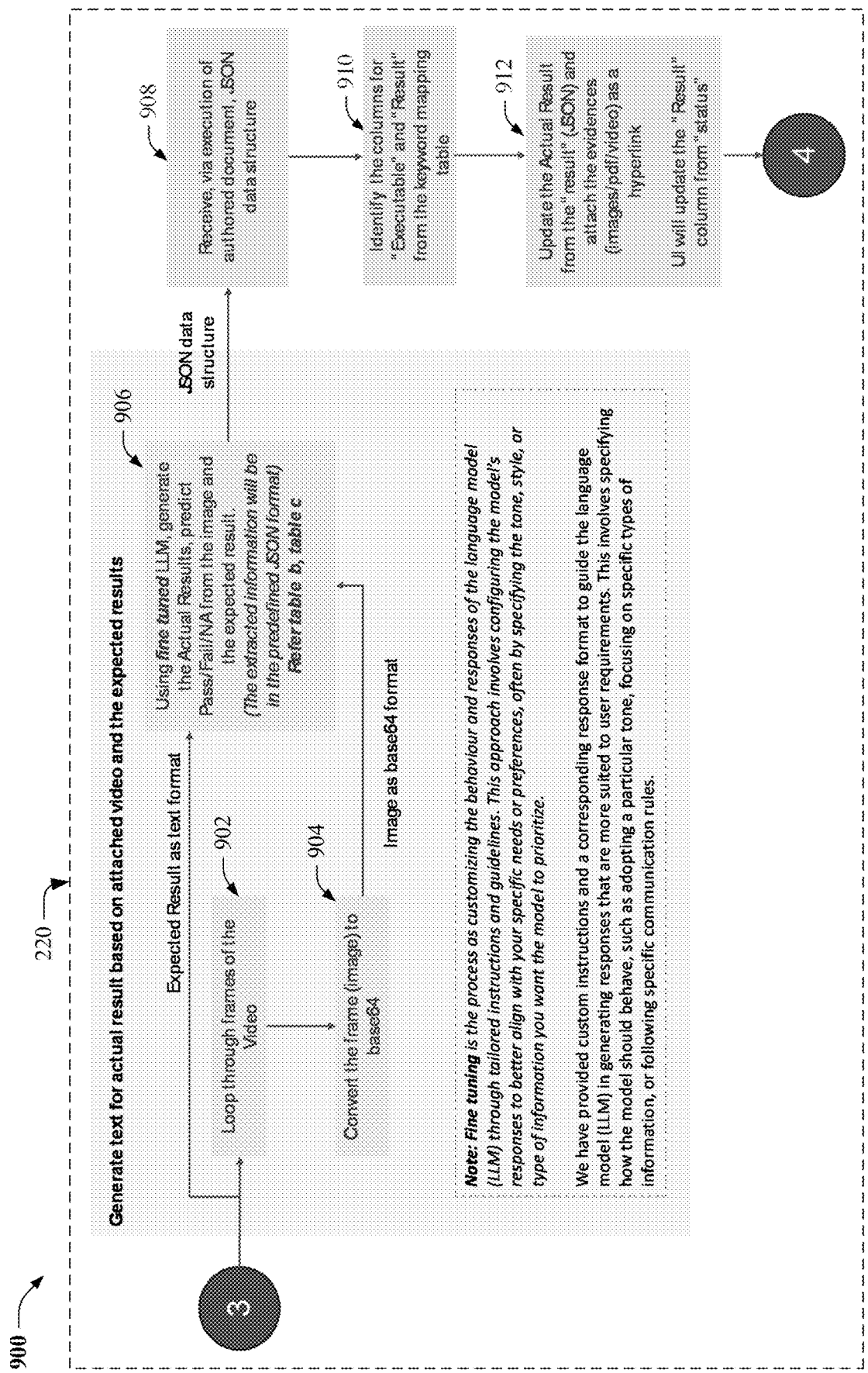
Figure 10:
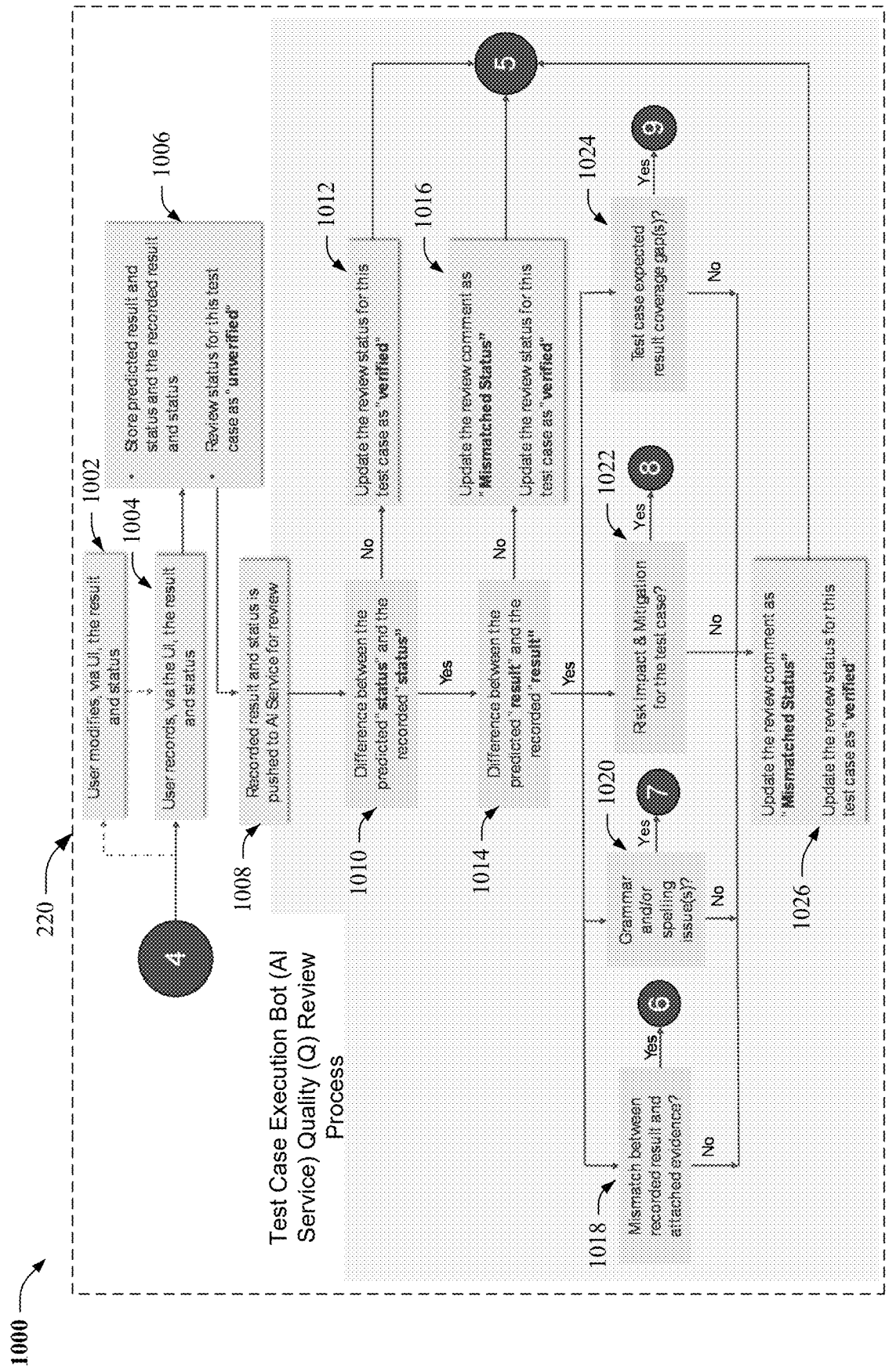
Figure 11:
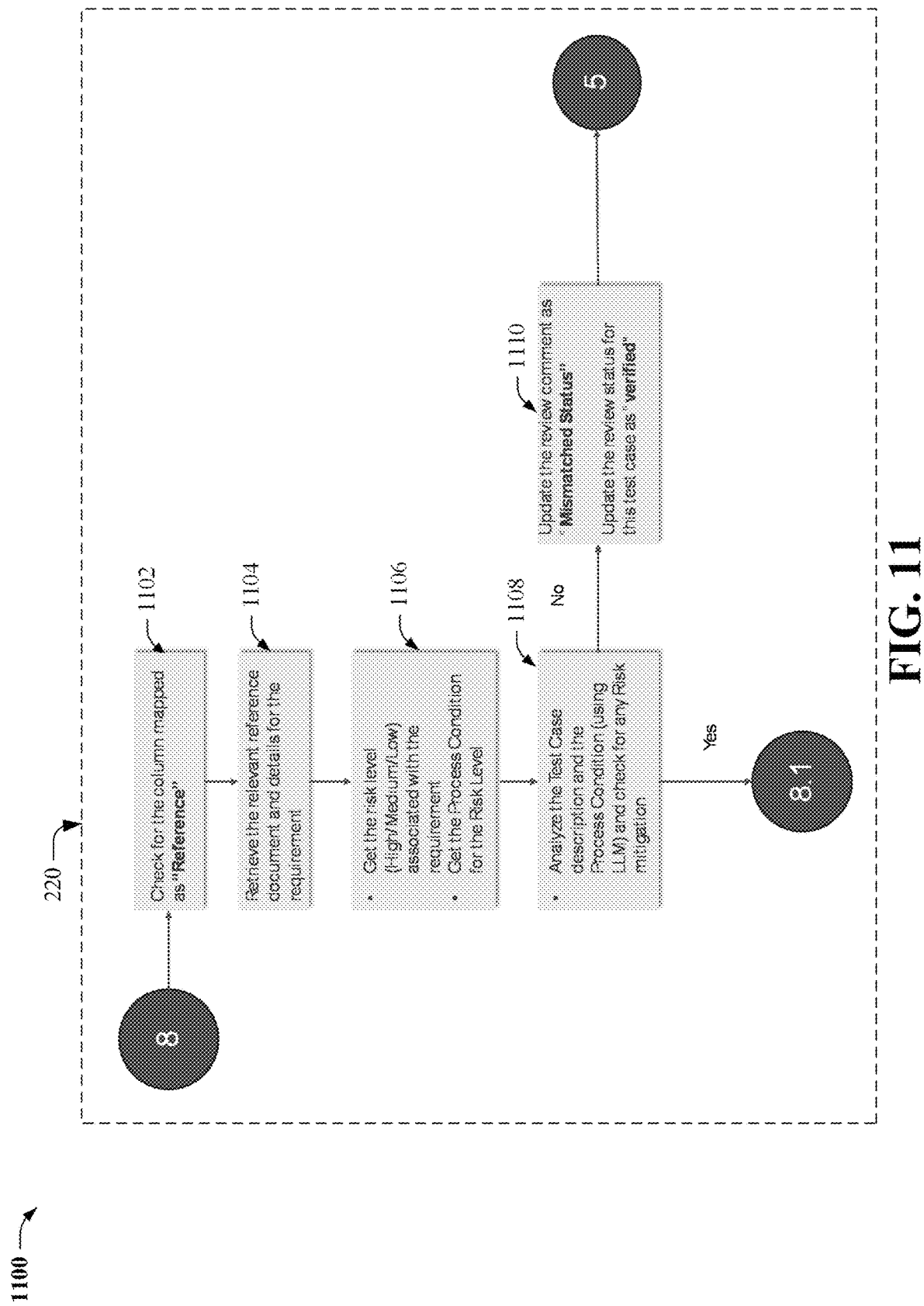
Figure 12:
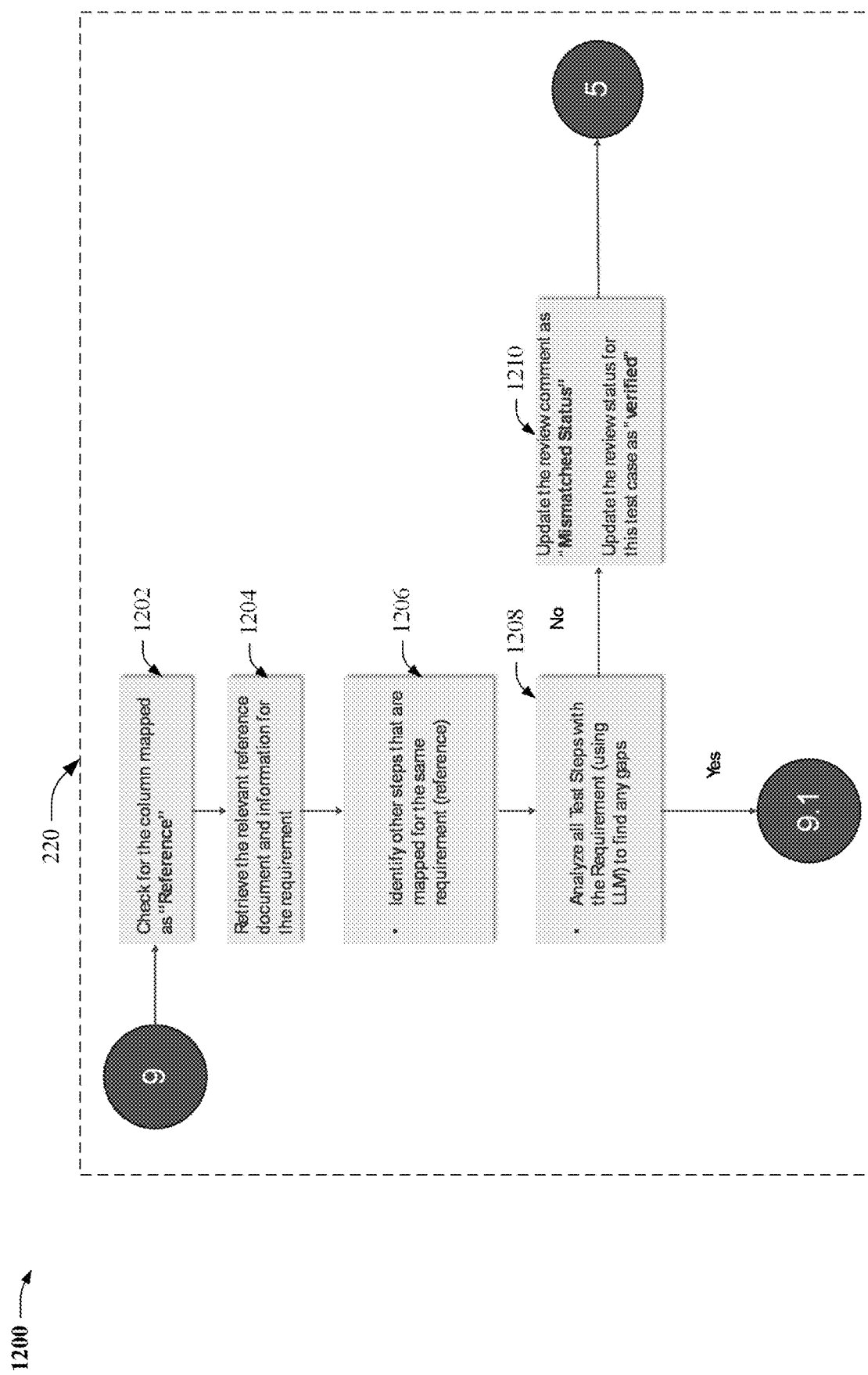
Figure 13:
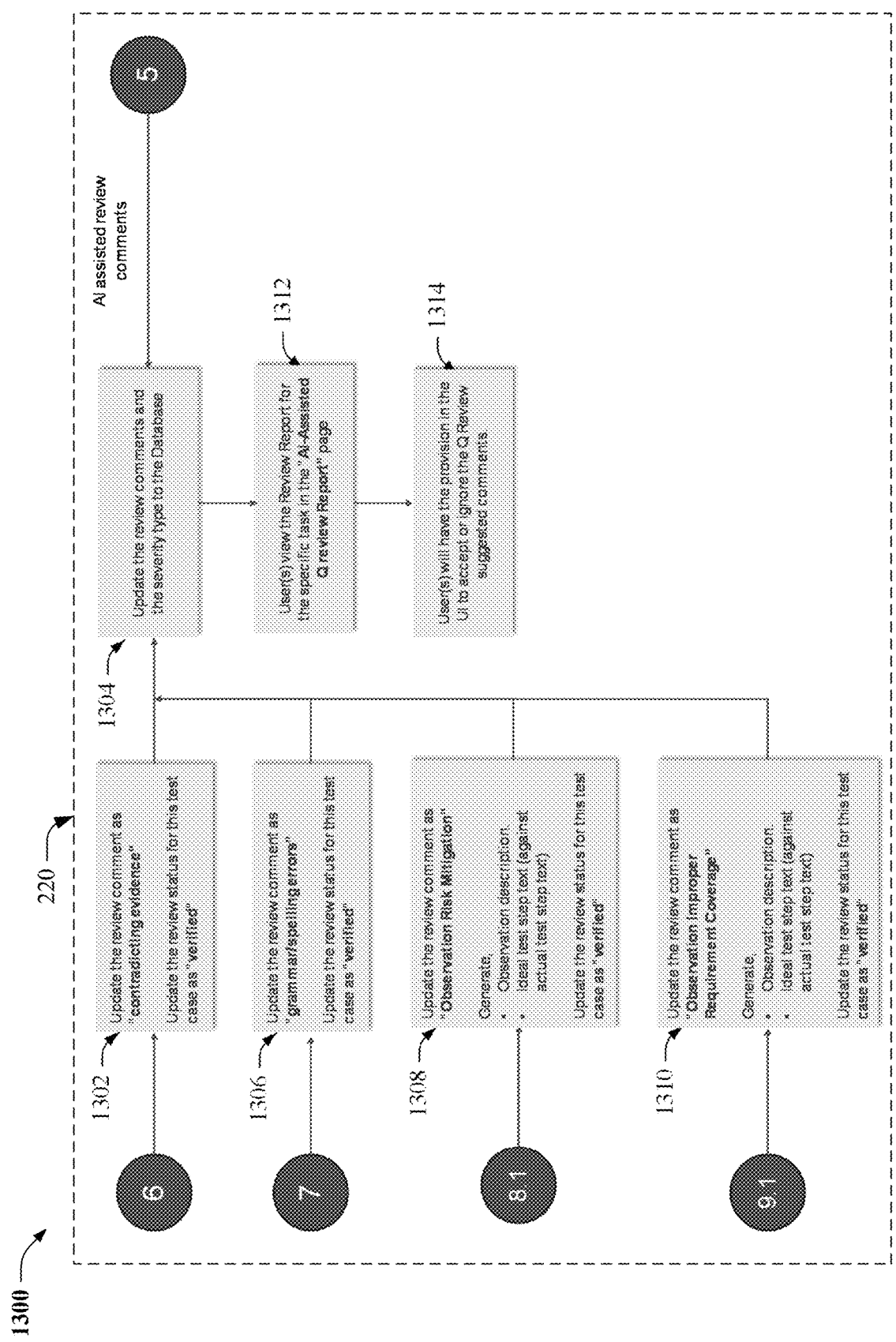
Figure 14:
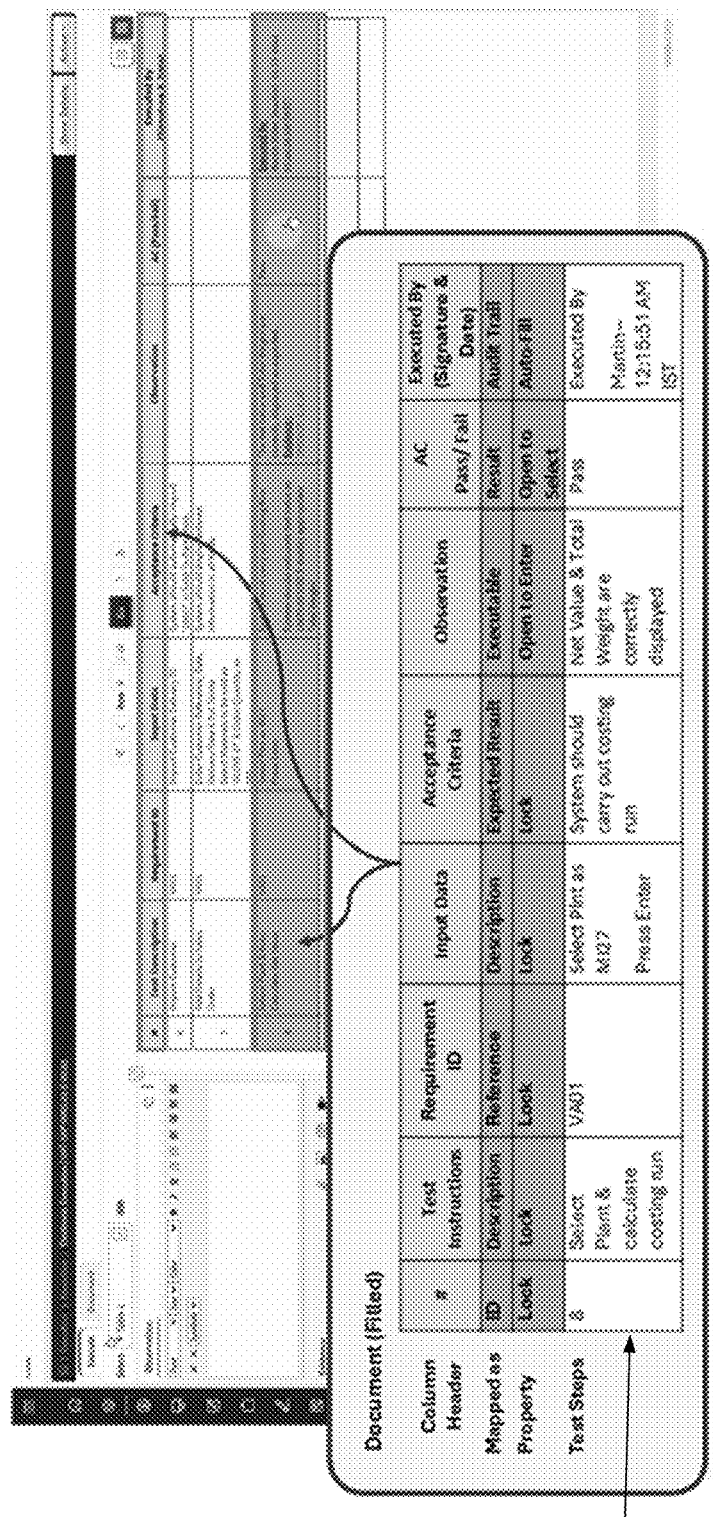
FIG. 14 illustrates a screen shot of a user interface (UI) of the automated test case validation execution system representing a test step/test case for which an automated test case validation execution has been performed, in accordance with various example embodiments.

Further, in embodiment(s) illustrated by Table c and FIGS. 7-9, the validation execution component generates a JSON data structure comprising the result sentence and the test status; based on a mapping of respective elements of the JSON data structure to respective cells of a second row of the table corresponding to the test status, the validation execution component populates, via the execution of the authored document (see e.g., 1410), the test result cell and the test status cell with the result sentence and the test status, respectively; and attaches (or associates), via the UI, the image-based evidence to the test result cell of the authored document, e.g., as a hyperlink that is a clickable reference that a user can select, via the UI, to access the image-based evidence. (See, e.g., 710, 712, 714, 808, 810, 812, 908, 910, and 912).

Now referring to embodiments(s) illustrated by FIGS. 10-13, the validation component can utilize a machine learning process (e.g., artificial intelligence (AI) service) to perform a Q review of the defined validation process according to the defined validation protocol. For example, in response to the test result cell and the test status cell being updated, by the automated test case validation execution system during the performance of the automated test case validation (see e.g., 1410), test personnel, e.g., a test validation executor, can manually derive respective modified versions of the test result and the test status at 1002.

At 1004, (1) the test personnel can manually record and/or copy, via the UI, the test result and test status (which have been derived and included, via the automated test case validation execution system in the test result cell and the test status cell, respectively) into a recorded test result cell of the table and a recorded test status cell of the table of the authored document, respectively, e.g. as a manually recorded test result and a manually recorded test status; or (2) if manually derived at 1002, the test personnel can manually record and/or copy, via the UI, the modified versions of the test result and the test status into the recorded test result cell and the recorded test status cell, respectively, e.g., as the manually recorded test result and the manually recorded test status.

Flow continues from 1004 to 1006, at which the automated test case validation execution system additionally stores the derived test result, the derived test status, the manually recorded test result, and the manually recorded test status in a data store (not shown) of the automated test case validation execution system.

Flow continues from 1006 to 1008, at which the validation component initiates performance of a Q review of the defined validation process based on the manually recorded test result and the manually recorded test status. In this regard, at 1010, the validation component obtains the derived test status and the manually recorded test status from the data store, and determines whether the derived test status is different from the manually recorded test status.

In response to determining that the derived test status is different than the manually recorded test status, the validation component obtains (at 1014) the derived test result and the manually recorded test result from the data store, and determines whether the derived test result is different than the manually recorded test result; otherwise, the validation component updates (at 1012) a review (or Q review) status for the test case as "verified", and process flow continues from 1012 to 1304.

In response to determining, at 1014, that the derived test result is different than the manually recorded test result, the validation component performs steps 1018, 1020, 1022, and 1024; otherwise, the validation component updates (at 1016) a review (or Q review) comment for the test case as "mismatched status", updates the review status for the test case as "verified", and process flow continues from 1016 to 1304.

At 1018, the validation component determines whether there is a mismatch between the image representing the test result and the manually recorded test result; and in response to determining that there is the mismatch between the image representing the test result and the manually recorded test result, process flow continues from 1018 to 1302, at which the validation component updates the review comment for the test case as "contradicting evidence", updates the review status for the test case as "verified", and process flow continues from 1302 to 1304; otherwise process flow continues from 1018 to 1026, at which the validation component updates the review comment for the test case as "mismatched status", updates the review status for the test case as "verified", and process flow continues from 1026 to 1304.

At 1020, the validation component determines whether the manually recorded test result and/or the result sentence comprises a grammatical error and/or a spelling error; and in response to determining that the manually recorded test result and/or the result sentence comprises the grammatical error and/or the spelling error, process flow continues from 1020 to 1306, at which the validation component updates the review comment for the test case as "grammar/spelling errors", updates the review status for the test case as "verified", and process flow continues from 1306 to 1304; otherwise process flow continues to from 1020 to 1026, at which the validation component updates the review comment for the test case as "mismatched status", updates the review status for the test case as "verified", and process flow continues from 1026 to 1304.

At 1022, the validation component determines, based on a defined risk level and a defined process condition for the defined risk level that have been associated with the test step, whether a risk mitigation condition applies to the test step; and in response to determining that the risk mitigation condition applies to the test step, process flow continues from 1022 to 1102; otherwise process flow continues from 1022 to 1026, at which the validation component updates the review comment for the test case as "mismatched status", updates the review status for the test case as "verified", and process flow continues from 1026 to 1304.

At 1102, the validation component obtains, via a column of the table corresponding to the test step that comprises a reference cell that identifies a reference document comprising information representing requirements/test requirements for the test step, the reference document.

Process flow continues from 1102 to 1104, at which the validation component retrieves the reference document and obtains the information representing the requirements/test requirements for test step.

Process flow continues from 1104 to 1106, at which the validation component obtains, based on the information representing the requirements/test requirements for test step, (1) a defined risk level (e.g., high, medium, low) that has been associated with the test step, and (2) a defined process condition for the defined risk level that have been associated with the test step.

Process flow continues from 1106 to 1108, at which the validation component determines, via the fine-tuned LLM based on the information representing the requirements/test requirements for test step and the defined process condition for the defined risk level that has been associated with the test step, whether a risk mitigation condition applies to the test step.

In response to determining, at 1108, that the risk mitigation condition applies to the test step, process flow continues from 1108 to 1308; otherwise process flow continues from 1108 to 1110, at which the validation component updates the review comment for the test case as "mismatched status", updates the review status for the test case as "verified", and process flow continues from 1110 to 1304.

At 1308, the validation component updates the review comment for the test case as "observation risk mitigation"; generates, via the fine-tuned LLM, an observation/description of the risk mitigation condition that applies to the test step, and based on the defined process condition and risk mitigation condition, generates, via the fine-tuned LLM, a revised test step; and updates the review status for the test case as "verified". In turn, process flow continues from 1308 to 1304.

At 1024, the validation component determines whether test steps that are different from the test step and that correspond to the defined validation process comprise respective defined expected results that are the same as the defined expected result of the test step for identifying test requirement (or test result) gaps representing differences between the respective defined expected results of the test steps, which are different from the test step, and the defined expected result for the test step.

In response to determining, at 1024, that the test steps that are different from the test step and that correspond to the defined validation process comprise respective defined expected results that are the same as the defined expected result of the test step, process flow continues from 1024 to 1202; otherwise process flow continues from 1024 to 1026, at which the validation component updates the review comment for the test case as "mismatched status", updates the review status for the test case as "verified", and process flow continues from 1024 to 1304.

At 1202, the validation component obtains, via a column of the table corresponding to the test step that comprises a reference cell that identifies a reference document comprising information representing requirements/test requirements for the test step, the reference document.

Process flow continues from 1202 to 1204, at which the validation component retrieves the reference document and obtains the information representing the requirements/test requirements for test step.

Process flow continues from 1204 to 1206, at which the validation component determines, via the fine-tuned LLM based on the information representing the requirements/test requirements for test step, whether test steps that are different from the test step and that correspond to the defined validation process comprise respective defined expected results that are the same as the defined expected result of the test step for identifying test requirement (or test result) gaps representing differences between the respective defined expected results of the test steps, which are different from the test step, and the defined expected result for the test step.

In response to determining, at 1208, that the test steps that are different from the test step and that correspond to the defined validation process comprise respective defined expected results that are the same as the defined expected result of the test step, process flow continues from 1208 to 1310; otherwise process flow continues from 1208 to 1210, at which the validation component updates the review comment for the test case as "mismatched status", updates the review status for the test case as "verified", and process flow continues from 1210 to 1304.

At 1310, the validation component updates the review comment for the test case as "observation improper requirement coverage"; generates, via the fine-tuned LLM, an observation/description representing that there are test requirement gap(s) between the test step and other test steps, different from the test step, which have respective defined expected results that are equivalent to the defined expected result of the test step; based on the observation/description, generates, via the fine-tuned LLM, a revised test step; and updates the review status for the test case as "verified". In turn, process flow continues from 1310 to 1304.

At 1304, the validation component stores the review comments and the review status in the data store. At 1312 and 1314, the validation component generates a summary, or Q review report, comprising results, e.g., respective review comments and respective review status, of the Q review of the validation execution of the test step; displays, via the UI the Q review report; and enables, via the UI, the test personnel to accept, or ignore, one or more of the respective review comments and the respective review status.

FIGS. 15-18 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 15:
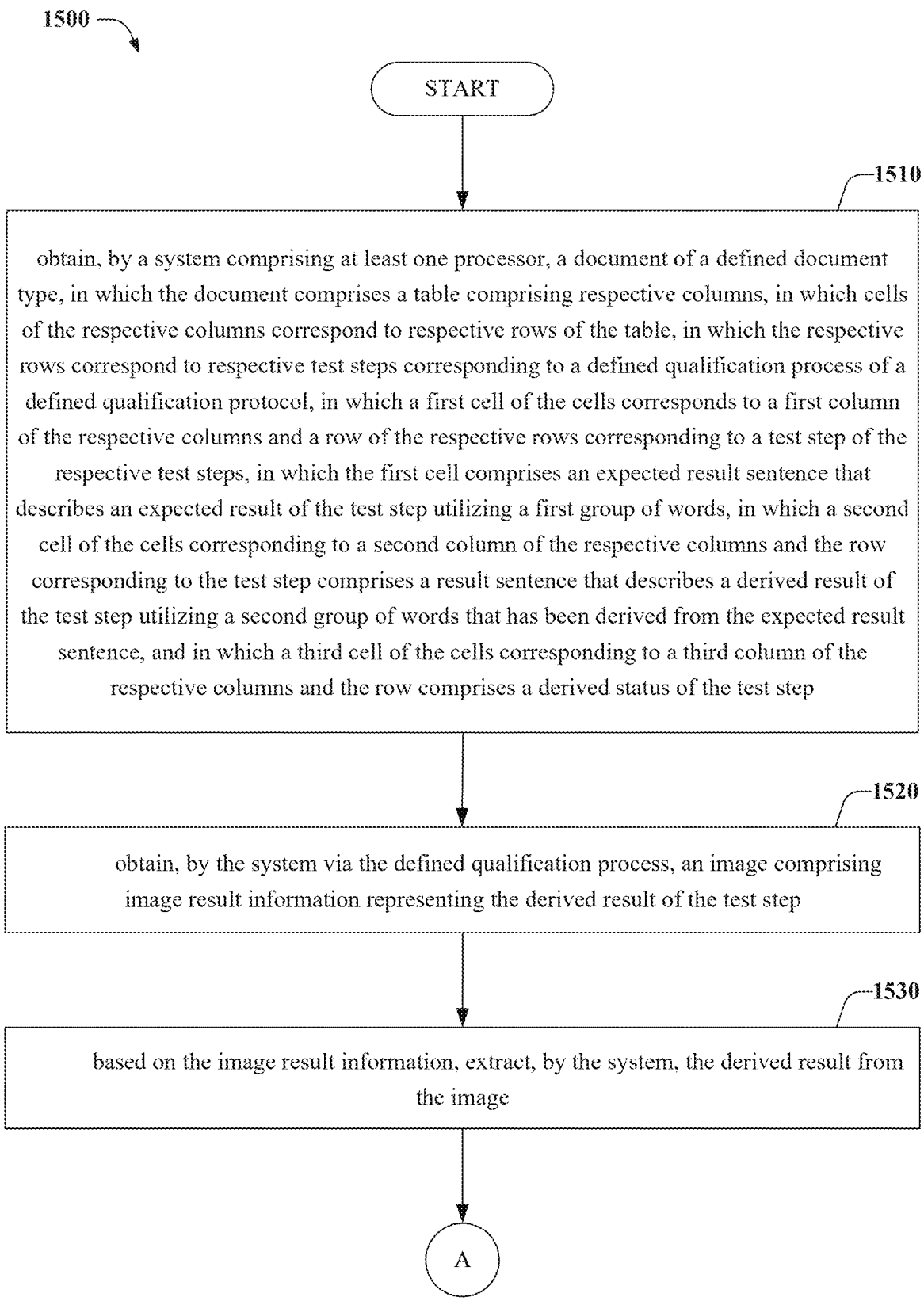
FIGS. 15-17 illustrate flow charts of a method performed by the automated test case validation execution system that facilitates automated test case validation/qualification execution corresponding to a defined validation/qualification protocol, in accordance with various example embodiments.
Figure 16:
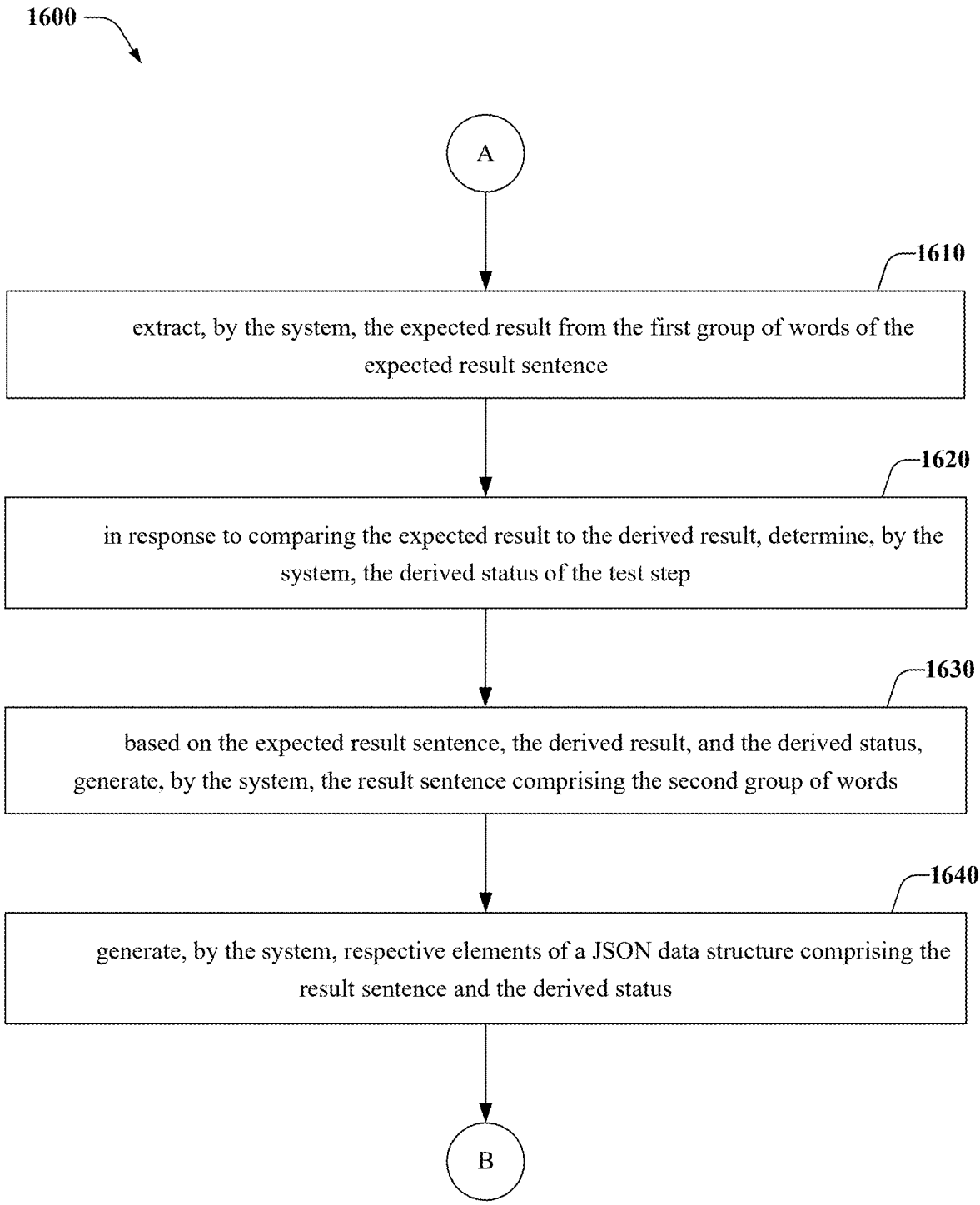
Figure 17:
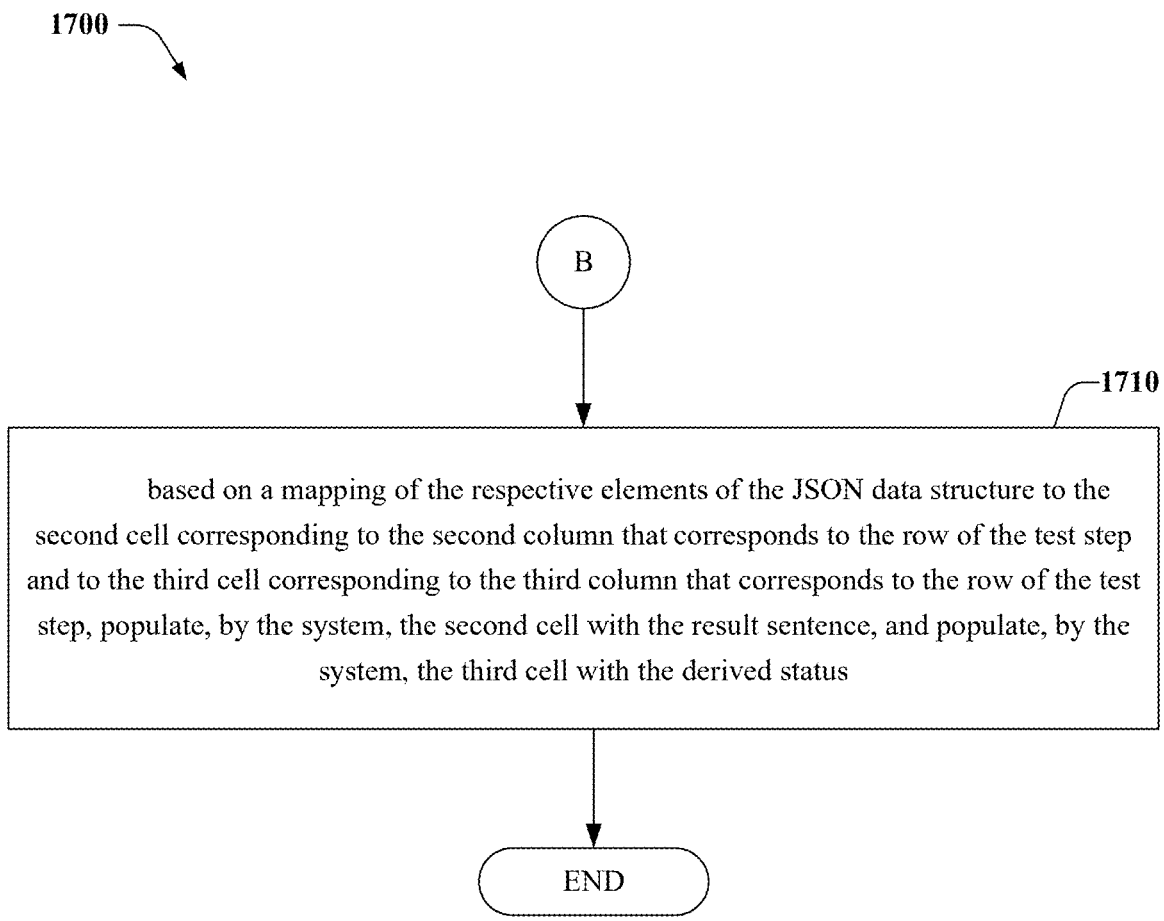

Referring now to FIGS. 15-17, flow charts (1500, 1600, 1700) of a method performed by a system (e.g., 110) that facilitates automated test case validation/qualification execution corresponding to a defined validation/qualification protocol are illustrated, in accordance with various example embodiments. At 1510, the system obtains a document of a defined document type, in which the document comprises a table comprising respective columns, in which cells of the respective columns correspond to respective rows of the table, in which the respective rows correspond to respective test steps corresponding to a defined qualification process of a defined qualification protocol, in which a first cell of the cells corresponds to a first column of the respective columns and a row of the respective rows corresponding to a test step of the respective test steps, in which the first cell comprises an expected result sentence that describes an expected result of the test step utilizing a first group of words, in which a second cell of the cells corresponding to a second column of the respective columns and the row corresponding to the test step comprises a result sentence that describes a derived result of the test step utilizing a second group of words that has been derived from the expected result sentence, and in which a third cell of the cells corresponding to a third column of the respective columns and the row comprises a derived status of the test step.

At 1520, the system obtains, via the defined qualification process, an image comprising image result information representing the derived result of the test step. At 1530, the system extracts, based on the image result information, the derived result from the image.

At 1610, the system extracts the expected result from the first group of words of the expected result sentence. At 1620, in response to comparing the expected result to the derived result, the system determines the derived status of the test step.

At 1630, based on the expected result sentence, the derived result, and the derived status, the system generates the result sentence comprising the second group of words. At 1640, the system generates respective elements of a JSON data structure comprising the result sentence and the derived status.

At 1710, based on a mapping of the respective elements of the JSON data structure to the second cell corresponding to the second column that corresponds to the row of the test step and to the third cell corresponding to the third column that corresponds to the row of the test step, the system populates the second cell with the result sentence, and populates the third cell with the derived status.

Figure 18:
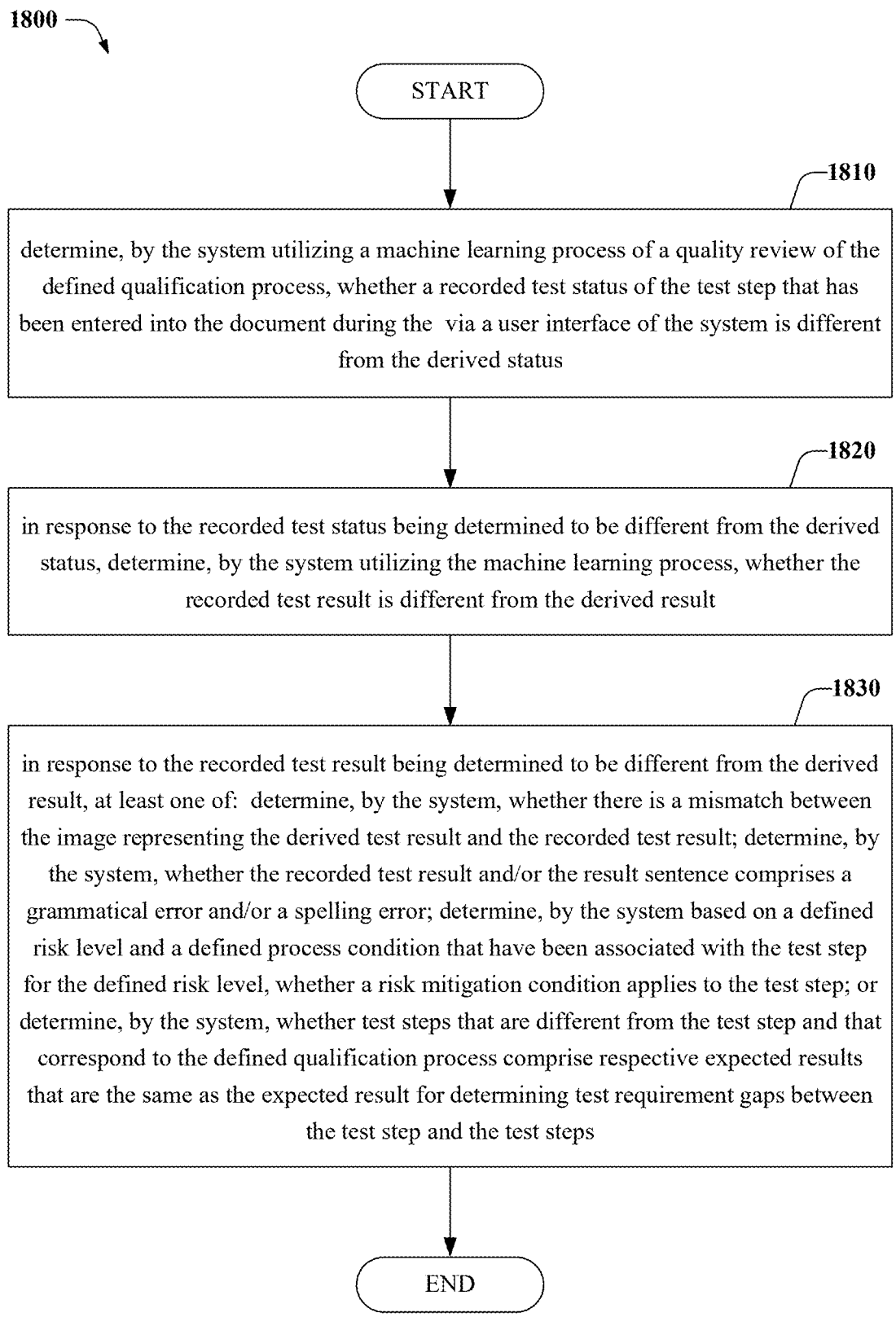
FIG. 18 illustrates a flow chart of a machine learning process for performing a quality (Q) review of the defined validation/qualification process, in accordance with various example embodiments.

FIG. 18 illustrates a flow chart (1800) of a machine learning process for performing a Q review of the defined validation/qualification process, in accordance with various example embodiments. At 1810, the system determines, utilizing a machine learning process of a Q review of the defined qualification process, whether a recorded test status of the test step that has been entered into the document during the via a user interface of the system is different from the derived status.

At 1820, in response to the recorded test status being determined to be different from the derived status, the system determines, utilizing the machine learning process, whether the recorded test result is different from the derived result. At 1830, in response to the recorded test result being determined to be different from the derived result, the system determines at least one of: whether there is a mismatch between the image representing the derived test result and the recorded test result; whether the recorded test result and/or the result sentence comprises a grammatical error and/or a spelling error; based on a defined risk level and a defined process condition that have been associated with the test step for the defined risk level, whether a risk mitigation condition applies to the test step; or whether test steps that are different from the test step and that correspond to the defined qualification process comprise respective expected results that are the same as the expected result for determining test requirement gaps between the test step and the test steps.

As it is employed in the subject specification, the terms "processor" and "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "memory component", "data store", "defined cleaning knowledge base", "data storage device", "storage medium" and substantially any other information storage component relevant to operation and functionality of a component and/or process, refer to memory components, or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in memory component 250, non-volatile memory 1922 (see below), disk storage 1924 (see below), and/or memory storage 1946 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 19:
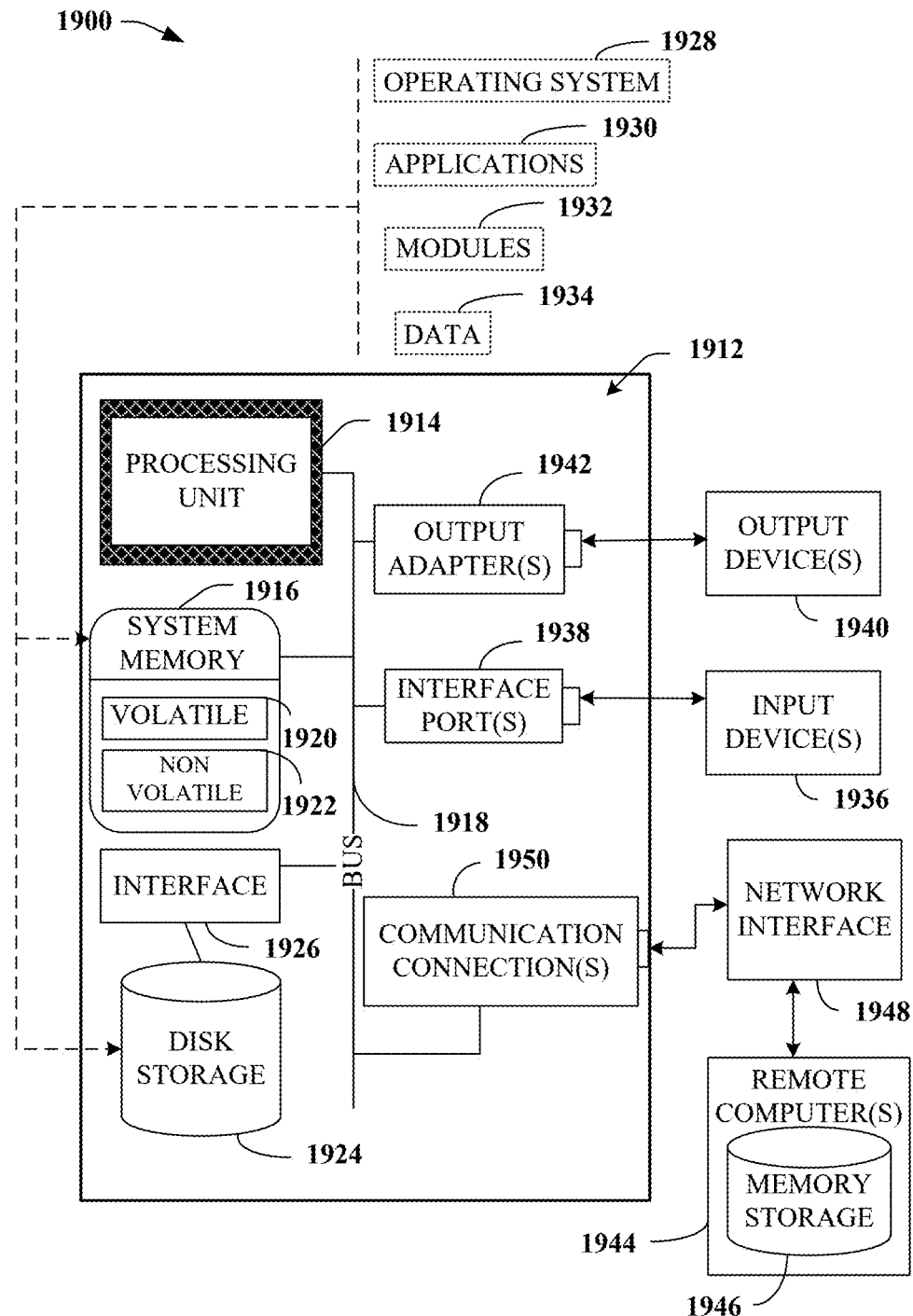
FIG. 19 is a block diagram representing an illustrative non-limiting computing system or operating environment in which one or more aspects of various embodiments described herein can be implemented.

In order to provide a context for the various aspects of the disclosed subject matter, FIG. 19, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 19, a block diagram of a computing system 1900 operable to execute the disclosed systems and methods is illustrated, in accordance with an embodiment. Computer 1912 comprises a processing unit 1914, a system memory 1916, and a system bus 1918. System bus 1918 couples system components comprising, but not limited to, system memory 1916 to processing unit 1914. Processing unit 1914 can be any of various available processors. Dual microprocessors and other multiprocessor architectures also can be employed as processing unit 1914.

System bus 1918 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1916 comprises volatile memory 1920 and nonvolatile memory 1922. A basic input/output system (BIOS), containing routines to transfer information between elements within computer 1912, such as during start-up, can be stored in nonvolatile memory 1922. By way of illustration, and not limitation, nonvolatile memory 1922 can comprise ROM, PROM, EPROM, EEPROM, or flash memory. Volatile memory 1920 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1912 also comprises removable/non-removable, volatile/non-volatile computer storage media. FIG. 19 illustrates, for example, disk storage 1924. Disk storage 1924 comprises, but is not limited to, devices like a magnetic disk drive, floppy disk drive, tape drive, Jaz drive, Zip drive, LS-100 drive, flash memory card, or memory stick. In addition, disk storage 1924 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to system bus 1918, a removable or non-removable interface is typically used, such as interface 1926.

It is to be appreciated that FIG. 19 describes software that acts as an intermediary between users and computer resources described in suitable operating environment 1900. Such software comprises an operating system 1928. Operating system 1928, which can be stored on disk storage 1924, acts to control and allocate resources of computer system 1912. System applications 1930 take advantage of the management of resources by operating system 1928 through program modules 1932 and program data 1934 stored either in system memory 1916 or on disk storage 1924. It is to be appreciated that the disclosed subject matter can be implemented with various operating systems or combinations of operating systems.

A user can enter commands or information into computer 1912 through input device(s) 1936. Input devices 1936 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1914 through system bus 1918 via interface port(s) 1938. Interface port(s) 1938 comprise, for example, a serial port, a parallel port, a game port, a universal serial bus (USB), a wireless based port, e.g., Wi-Fi, Bluetooth, etc. Output device(s) 1940 use some of the same type of ports as input device(s) 1936.

Thus, for example, a USB port can be used to provide input to computer 1912 and to output information from computer 1912 to an output device 1940. Output adapter 1942 is provided to illustrate that there are some output devices 1940, like display devices, light projection devices, monitors, speakers, and printers, among other output devices 1940, which use special adapters. Output adapters 1942 comprise, by way of illustration and not limitation, video and sound devices, cards, etc. that provide means of connection between output device 1940 and system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. Remote computer(s) 1944 can be a personal computer, a server, a router, a network PC, a workstation, a microprocessor based appliance, a peer device, or other common network node and the like, and typically comprises many or all of the elements described relative to computer 1912.

For purposes of brevity, only a memory storage device 1946 is illustrated with remote computer(s) 1944. Remote computer(s) 1944 is logically connected to computer 1912 through a network interface 1948 and then physically and/or wirelessly connected via communication connection 1950. Network interface 1948 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1950 refer(s) to hardware/software employed to connect network interface 1948 to bus 1918. While communication connection 1950 is shown for illustrative clarity inside computer 1912, it can also be external to computer 1912. The hardware/software for connection to network interface 1948 can comprise, for example, internal and external technologies such as modems, comprising regular telephone grade modems, cable modems and DSL modems, wireless modems, ISDN adapters, and Ethernet cards.

The computer 1912 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1912 can connect to other devices/networks by way of antenna, port, network interface adaptor, wireless access point, modem, and/or the like.

The computer 1912 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component", "system", "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. (e.g., component(s), process(es), and/or service(s) corresponding to automated test case validation execution system 110) can employ classifier(s) that are explicitly trained, e.g., via a generic training data, as well as implicitly trained, e.g., by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by component(s), process(es), and/or service(s) of the automated test case validation execution system, comprising, but not limited to: determining, by a system utilizing a machine learning process of a Q review of the defined qualification process, whether a recorded test status of the test step that has been entered into the document via a user interface of the system is different from the derived status; in response to the recorded test status being determined to be different from the derived status, determining, by the system utilizing the machine learning process, whether the recorded test result is different from the derived result; and in response to the recorded test result being determined to be different from the derived result, at least one of determining, by the system, whether there is a mismatch between the image representing the derived test result and the recorded test result, determining, by the system, whether at least one of the recorded test result or the result sentence comprises at least one of a grammatical error or a spelling error, determining, by the system based on a defined risk level and a defined process condition that have been associated with the test step for the defined risk level, whether a risk mitigation condition applies to the test step, or determining, by the system, whether test steps that are different from the test step and that correspond to the defined qualification process comprise respective expected results that are the same as the expected result for determining test requirement gaps between the test step and the test steps.

A classifier can be a function that maps an input attribute vector, $x=(x1, x2, x3, x4, xn)$, to a confidence that the input belongs to a class, that is, $f(x)=$confidence (class). Such classification can employ a probabilistic and/or statistical-based analysis (e.g., factoring into the analysis utilities and costs) to infer an action that a user desires to be automatically performed. In the case of automated test case validation execution system disclosed herein, for example, attributes can be information corresponding to operations performed via the automated test case validation execution system that has been stored via a data store, and the classes can be categories or areas of interest, e.g., corresponding to defined conditions and/or thresholds utilized via the automated test case validation execution system. A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor, coupled to at least one memory, that executes or facilitates execution of executable components, comprising:
   a test case validation execution initiation component that initiates, via a user interface (UI), an execution of an authored document comprising a table of rows and columns, in which each row of the table represents a respective test step corresponding to a defined validation process, and in which each row comprises a respective test result cell and a respective test status cell that are populated, by the system via the execution of the authored document, with a test result of the respective test step and a test status of the respective test step, respectively, in response to an image representing the test result being obtained by the system during the execution of the authored document; and an automatic test case validation execution component that, in response to the image representing the test result being obtained by the system during the execution of the authored document, automatically parses the image and extracts the test result from the image, derives a defined expected result for the test step from an expected result sentence that has been obtained from an expected result sentence cell of a row of the rows, interprets the test result based on the defined expected result to derive the test status, generates a result sentence comprising the test result and a portion of the expected result sentence, generates a javascript object notation (JSON) data structure comprising the result sentence and the test status, and populates, using the JSON data structure via the execution of the authored document, the test result cell and the test status cell with the result sentence and the test status, respectively.

2. The system of claim 1, wherein the automatic test case validation execution component comprises:

an image processing component that obtains, via the UI corresponding to an upload operation, an uploaded image, a video comprising a series of frames comprising respective images, a file comprising a series of pages, or a snapshot comprising a display image of a display of an equipment that has been used during the respective test step, based on the uploaded image, a respective image of the respective images of the series of frames of the video, a page of the series of pages of the file, or the display image of the snapshot into the image, generates the image, and converts the image into a revised image comprising base 64 format.

3. The system of claim 2, wherein the automatic test case validation execution component further comprises:

an image extraction component that parses the revised image and extracts the test result from the revised image; and a sentence extraction component that utilizes a fine-tuned language learning model (LLM) to derive the defined expected result from the expected result sentence, and generate the result sentence comprising the test result and the portion of the expected result sentence.

4. The system of claim 3, wherein the row is a first row, and wherein the automatic test case execution component further comprises:

a validation execution component that utilizes the fine-tuned LLM to interpret the test result based on the defined expected result to derive the test status, generate the JSON data structure comprising the result sentence and the test status, and based on a mapping of respective elements of the JSON data structure to respective cells of a second row of the table corresponding to the test status, populate, via the execution of the authored document, the test result cell and the test status cell with the result sentence and the test status, respectively.

5. The system of claim 1, further comprising:

a validation component that utilizes a machine learning process to perform a quality (Q) review of the defined validation process according to a defined validation protocol, the Q review comprising obtaining a recorded test result of the respective test step and a recorded test status of the respective test step, wherein the recorded test result and the recorded test status have been entered, via the UI, into the authored document;

in response to determining that the recorded test status is different than the test status, determining whether the recorded test result is different than the test result; and in response to determining that the recorded test result is different than the test result, at least one of determining whether there is a mismatch between the image representing the test result and the recorded test result, determining whether at least one of the recorded result or the result sentence comprises at least one of a grammatical error or a spelling error, determining, based on a defined risk level and a defined process condition for the defined risk level that have been associated with the respective test step, whether a risk mitigation condition applies to the respective test step, or determining whether test steps that are different from the test step and that correspond to the defined validation process comprise respective defined expected results that are the same as the defined expected result of the test step for identifying test requirement gaps representing differences between the respective defined expected result and the defined expected result.

6. The system of claim 5, wherein in response to determining that the recorded test result is the same as the test result, the validation component:

updates a review comment of the row with text representing that there is mismatched status; and updates a review status of the row with text representing that the respective test step has been verified.

7. The system of claim 1, wherein the row is a first row, wherein the respective test step is a first test step, wherein the authored document comprises a defined document type, wherein respective defined properties have been assigned to respective cells of the columns and have been associated with respective cell properties that have been defined by the defined document type, wherein a first defined property of the respective defined properties that has been assigned to a first cell of the respective cells corresponding to a first column of the columns and a second row of the rows corresponding to a second test step prevents the first cell from being modified, wherein a second defined property of the respective defined properties that has been assigned to a second cell of the respective cells corresponding to a second column of the columns and the second row corresponding to the second test step enables the second cell to be modified by the system via the defined validation process during the execution of the authored document, and wherein a third defined property of the respective defined properties that has been assigned to a third cell of the respective cells corresponding to a third column of the columns and the second row enables the third cell to be modified by the system via the defined validation process during the execution of the authored document.

8. The system of claim 7, wherein the authored document is an MS® Word document, an Adobe® PDF document, or an MS® Excel document, and wherein the respective defined properties comprise:
executable with audit trail, executable without audit trail, recorded test result with audit trail, recorded test result without audit trail, non-executable, expected result, expected result sentence, result with audit trail, result without audit trail, recorded test status with audit trail, recorded test status without audit trail, audit trail, and witnessed and verified by.

9. The system of claim 8, wherein the authored document is the Adobe® PDF document, and wherein the respective defined propertied comprise:
textbook executable, recorded test result, dropdown result, or recorded test status.

10. The system of claim 8, wherein the authored document is the MS® Word document or the MS® Excel document, and wherein the respective cell properties comprise:
write, unlock, open to enter, or open to select.

11. The system of claim 8, wherein the authored document is the MS® Word document or the MS® Excel document, and wherein the respective cell properties comprise:
read, lock, or non-editable.

12. The system of claim 8, wherein the authored document is the Adobe® PDF document, and wherein the respective cell properties comprise:
write, unlock, open to enter, or open to select.

13. A method, comprising:
obtaining, by a system comprising at least one processor, a document of a defined document type, wherein the document comprises a table comprising respective columns, wherein cells of the respective columns correspond to respective rows of the table, wherein the respective rows correspond to respective test steps corresponding to a defined qualification process of a defined qualification protocol, wherein a first cell of the cells corresponds to a first column of the respective columns and a row of the respective rows corresponding to a test step of the respective test steps, wherein the first cell comprises an expected result sentence that describes an expected result of the test step utilizing a first group of words, wherein a second cell of the cells corresponding to a second column of the respective columns and the row corresponding to the test step comprises a result sentence that describes a derived result of the test step utilizing a second group of words that has been derived from the expected result sentence, and wherein a third cell of the cells corresponding to a third column of the respective columns and the row comprises a derived status of the test step;
obtaining, by the system via the defined qualification process, an image comprising image result information representing the derived result of the test step;
based on the image result information, extracting, by the system, the derived result from the image;
extracting, by the system, the expected result from the first group of words of the expected result sentence;
in response to comparing the expected result to the derived result, determining, by the system, the derived status of the test step;
based on the expected result sentence and the derived result, generating, by the system, the result sentence comprising the second group of words;
generating, by the system, respective elements of a JSON data structure comprising the result sentence and the derived status; and
based on a mapping of the respective elements of the JSON data structure to the second cell corresponding to the second column that corresponds to the row of the test step and to the third cell corresponding to the third column that corresponds to the row of the test step,
populating, by the system, the second cell with the result sentence, and
populating, by the system, the third cell with the derived status.

14. The method of claim 13, wherein the obtaining of the image comprises:
obtaining, via a user interface of the system, an uploaded image, an uploaded video comprising a series of video frames comprising respective images, an uploaded file comprising a series of pages, or an uploaded display image comprising a snapshot of a display of a device corresponding to the test step; and
generating the image based on the uploaded image, a video frame of the series of video frames of the uploaded video, a page of the series of pages of the uploaded file, or the uploaded display image of the display of the device.

15. The method of claim 13, wherein the extracting of the derived result from the image comprises:
parsing the image to obtain the derived result.

16. The method of claim 15, wherein the extracting of the expected result from the first group of words of the expected result sentence comprises:
obtaining the expected result sentence from the first cell of the table of the document; and
deriving, utilizing a fine-tuned language learning model, the expected result from the first group of words of the expected result sentence.

17. The method of claim 16, wherein the determining of the derived status comprises:
based on the expected result and the derived result, determining the derived status.

18. The method of claim 17, further comprising:
determining, by the system utilizing a machine learning process of a quality review of the defined qualification process, whether a recorded test status of the test step that has been entered into the document via a user interface of the system is different from the derived status;
in response to the recorded test status being determined to be different from the derived status, determining, by the system utilizing the machine learning process, whether the recorded test result is different from the derived result; and
in response to the recorded test result being determined to be different from the derived result, at least one of
determining, by the system, whether there is a mismatch between the image representing the derived test result and the recorded test result,
determining, by the system, whether at least one of the recorded test result or the result sentence comprises at least one of a grammatical error or a spelling error,
determining, by the system based on a defined risk level and a defined process condition that have been associated with the test step for the defined risk level, whether a risk mitigation condition applies to the test step, or determining, by the system, whether test steps that are different from the test step and that correspond to the defined qualification process comprise respective expected results that are the same as the expected result for determining test requirement gaps between the test step and the test steps.

19. A non-transitory machine-readable medium, comprising executable instructions that, when executed by at least one processor, facilitate performance of operations, comprising:

obtaining image data representing a test result of a test step of respective test steps of a validation process;

extracting the test result from the image data;

deriving an expected result from an expected result sentence that has been obtained from a first cell of a row of rows of a table of a document, wherein the rows correspond to the respective test steps, and wherein the row corresponds to the test step;

based on the test result and the expected result, determining a test status of the test step;

generating a result sentence comprising the test result and a portion of the expected result sentence;

generating a javascript object notation (JSON) data structure comprising the result sentence and the test status; and populating, using the JSON data structure, a second cell of the row with the result sentence and a third cell of the row with the test status.

20. The non-transitory machine-readable medium of claim 19, wherein the populating further comprises:

based on a mapping of respective elements of the JSON data structure to respective cells of the row comprising the first cell, the second cell, and third cell, populating the second cell with the result sentence and the third cell with the test status.

* * * * *